US008652686B2

(12) United States Patent
Visco et al.

(10) Patent No.: US 8,652,686 B2
(45) Date of Patent: Feb. 18, 2014

(54) SUBSTANTIALLY IMPERVIOUS LITHIUM SUPER ION CONDUCTING MEMBRANES

(71) Applicants: Steven J. Visco, Berkeley, CA (US); Lutgard C. De Jonghe, Lafayette, CA (US); Yevgeniy S. Nimon, Danville, CA (US)

(72) Inventors: Steven J. Visco, Berkeley, CA (US); Lutgard C. De Jonghe, Lafayette, CA (US); Yevgeniy S. Nimon, Danville, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

(21) Appl. No.: 13/673,789

(22) Filed: Nov. 9, 2012

(65) Prior Publication Data
US 2013/0344397 A1 Dec. 26, 2013

Related U.S. Application Data

(63) Continuation of application No. 13/453,964, filed on Apr. 23, 2012, now Pat. No. 8,334,075, which is a continuation of application No. 11/612,741, filed on Dec. 19, 2006, now Pat. No. 8,182,943.

(60) Provisional application No. 60/752,255, filed on Dec. 19, 2005.

(51) Int. Cl.
H01M 4/13 (2010.01)

(52) U.S. Cl.
USPC ...... 429/231.95; 429/104; 429/145; 429/304; 429/306; 429/218.1; 429/236; 429/249; 429/245; 429/465; 429/475; 429/529

(58) Field of Classification Search
USPC ......... 429/465, 475–479, 489, 492, 529–532, 429/104, 126, 145, 300, 304, 306, 321–323, 429/218.1, 231.95, 231.9, 236, 251, 249
See application file for complete search history.

(56) References Cited

U.S. PATENT DOCUMENTS 3,528,856 A  9/1970 Ovshinsky
3,607,417 A  9/1971 McRae et al.
(Continued)

FOREIGN PATENT DOCUMENTS

EP  0111213  11/1983
EP  0111214  11/1983
(Continued)

OTHER PUBLICATIONS

International Search Report and Written Opinion dated Oct. 18, 2005 from International Application No. PCT/US2004/033372.
(Continued)

Primary Examiner — Patrick Ryan
Assistant Examiner — Ben Lewis
(74) Attorney, Agent, or Firm — Weaver Austin Villeneuve & Sampson LLP

(57) ABSTRACT

A composite solid electrolyte includes a monolithic solid electrolyte base component that is a continuous matrix of an inorganic active metal ion conductor and a filler component used to eliminate through porosity in the solid electrolyte. In this way a solid electrolyte produced by any process that yields residual through porosity can be modified by the incorporation of a filler to form a substantially impervious composite solid electrolyte and eliminate through porosity in the base component. Methods of making the composites are also disclosed. The composites are generally useful in electrochemical cell structures such as battery cells and in particular protected active metal anodes, particularly lithium anodes, that are protected with a protective membrane architecture incorporating the composite solid electrolyte. The protective architecture prevents the active metal of the anode from deleterious reaction with the environment on the other (cathode) side of the architecture, which may include aqueous, air and organic liquid electrolytes and/or electrochemically active materials.

20 Claims, 9 Drawing Sheets

(56) References Cited

U.S. PATENT DOCUMENTS

| | | | |
|---|---|---|---|
| 3,615,835 A | 10/1971 | Ovshinsky |
| 3,625,769 A | 12/1971 | Lyall |
| 3,703,415 A | 11/1972 | Mitoff et al. |
| 3,912,536 A | 10/1975 | Galli et al. |
| 3,976,509 A | 8/1976 | Tsai et al. |
| 4,007,057 A | 2/1977 | Littauer et al. |
| 4,091,182 A | 5/1978 | Farrington et al. |
| 4,162,202 A | 7/1979 | Dey |
| 4,163,084 A | 7/1979 | Tsai et al. |
| 4,210,707 A | 7/1980 | Farrington |
| 4,248,682 A | 2/1981 | Lindstrom et al. |
| 4,402,995 A | 9/1983 | Fleischer |
| 4,405,416 A | 9/1983 | Raistrick et al. |
| 4,414,293 A | 11/1983 | Joy et al. |
| 4,504,561 A | 3/1985 | Winsel |
| 4,828,942 A | 5/1989 | Licht |
| 4,833,048 A | 5/1989 | De Jonghe et al. |
| 4,916,036 A | 4/1990 | Cheiky |
| 4,917,974 A | 4/1990 | Visco et al. |
| 4,981,672 A | 1/1991 | De Neufville et al. |
| 4,985,317 A | 1/1991 | Adachi et al. |
| 5,035,963 A | 7/1991 | Plichta |
| 5,100,523 A | 3/1992 | Helms et al. |
| 5,108,856 A | 4/1992 | Shuster |
| 5,162,175 A | 11/1992 | Visco et al. |
| 5,166,011 A | 11/1992 | Rao et al. |
| 5,198,081 A | 3/1993 | Kanoh et al. |
| 5,213,908 A | 5/1993 | Hagedorn |
| 5,314,765 A | 5/1994 | Bates |
| 5,336,384 A | 8/1994 | Tsou et al. |
| 5,338,625 A | 8/1994 | Bates et al. |
| 5,342,710 A | 8/1994 | Koksbang |
| 5,387,479 A | 2/1995 | Koksbang |
| 5,409,786 A | 4/1995 | Bailey |
| 5,413,881 A | 5/1995 | Licht et al. |
| 5,427,873 A | 6/1995 | Shuster |
| 5,455,126 A | 10/1995 | Bates et al. |
| 5,506,068 A | 4/1996 | Dan et al. |
| 5,510,209 A | 4/1996 | Abraham et al. |
| 5,512,147 A | 4/1996 | Bates et al. |
| 5,516,598 A | 5/1996 | Chu et al. |
| 5,523,179 A | 6/1996 | Chu |
| 5,525,442 A | 6/1996 | Shuster |
| 5,532,077 A | 7/1996 | Chu |
| 5,567,210 A | 10/1996 | Bates et al. |
| 5,569,520 A | 10/1996 | Bates |
| 5,571,600 A | 11/1996 | Licht |
| 5,582,623 A | 12/1996 | Chu |
| 5,597,660 A | 1/1997 | Bates et al. |
| 5,612,152 A | 3/1997 | Bates |
| 5,648,183 A | 7/1997 | Licht et al. |
| 5,648,187 A | 7/1997 | Skotheim |
| 5,652,068 A | 7/1997 | Shuster et al. |
| 5,665,481 A | 9/1997 | Shuster et al. |
| 5,686,201 A | 11/1997 | Chu |
| 5,693,212 A | 12/1997 | Mazanec et al. |
| 5,696,201 A | 12/1997 | Cavalloni et al. |
| 5,702,995 A | 12/1997 | Fu |
| 5,789,108 A | 8/1998 | Chu |
| 5,814,420 A | 9/1998 | Chu |
| 5,882,812 A | 3/1999 | De Jonghe et al. |
| 5,961,672 A | 10/1999 | Skotheim et al. |
| 5,962,171 A | 10/1999 | Boguslavsky et al. |
| 6,017,651 A | 1/2000 | Chu et al. |
| 6,025,094 A | 2/2000 | Visco et al. |
| 6,025,095 A | 2/2000 | Kawamura |
| 6,030,720 A | 2/2000 | Chu et al. |
| 6,030,909 A | 2/2000 | Fu |
| 6,066,417 A | 5/2000 | Cho et al. |
| 6,068,950 A | 5/2000 | Gan et al. |
| 6,096,447 A | 8/2000 | Gan et al. |
| 6,110,236 A | 8/2000 | Chu et al. |
| 6,146,787 A | 11/2000 | Harrup et al. |
| 6,165,644 A | 12/2000 | Chu et al. |
| 6,183,901 B1 | 2/2001 | Ying et al. |
| 6,198,701 B1 | 3/2001 | De Jonghe et al. |
| 6,200,701 B1 | 3/2001 | Gan et al. |
| 6,200,704 B1 | 3/2001 | De Jonghe et al. |
| 6,203,942 B1 | 3/2001 | Gan et al. |
| 6,203,947 B1 | 3/2001 | Peled et al. |
| 6,207,324 B1 | 3/2001 | Licht |
| 6,210,832 B1 | 4/2001 | Chu et al. |
| 6,214,061 B1 | 4/2001 | Visco et al. |
| 6,225,002 B1 | 5/2001 | Chu et al. |
| 6,228,527 B1 | 5/2001 | Medeiros et al. |
| 6,248,481 B1 | 6/2001 | De Jonghe et al. |
| 6,274,269 B1 | 8/2001 | Gan et al. |
| 6,280,598 B1 | 8/2001 | Barton et al. |
| 6,296,958 B1 | 10/2001 | Pinto et al. |
| 6,315,881 B1 | 11/2001 | Fu |
| 6,358,643 B1 | 3/2002 | Katz et al. |
| 6,358,651 B1 | 3/2002 | Chen et al. |
| 6,376,123 B1 | 4/2002 | Chu |
| 6,391,492 B1 | 5/2002 | Kawakami et al. |
| 6,402,795 B1 | 6/2002 | Chu et al. |
| 6,413,284 B1 | 7/2002 | Chu et al. |
| 6,413,285 B1 | 7/2002 | De Jonghe et al. |
| 6,432,584 B1 | 8/2002 | Visco et al. |
| 6,475,677 B1 | 11/2002 | Inda et al. |
| 6,485,622 B1 | 11/2002 | Fu |
| 6,489,055 B1 | 12/2002 | Ichihashi et al. |
| 6,495,285 B2 | 12/2002 | Gan et al. |
| 6,511,772 B2 | 1/2003 | Gan et al. |
| 6,537,698 B2 | 3/2003 | Gan et al. |
| 6,537,701 B1 | 3/2003 | Chu et al. |
| 6,632,573 B1 | 10/2003 | Nimon et al. |
| 6,723,140 B2 | 4/2004 | Chu et al. |
| 6,733,924 B1 | 5/2004 | Skotheim et al. |
| 6,737,197 B2 | 5/2004 | Chu et al. |
| 6,766,817 B2 | 7/2004 | Da Silva |
| 6,770,187 B1 | 8/2004 | Putter et al. |
| 6,797,428 B1 | 9/2004 | Skotheim et al. |
| 6,835,492 B2 | 12/2004 | Cho et al. |
| 6,911,280 B1 | 6/2005 | De Jonghe et al. |
| 6,955,866 B2 | 10/2005 | Nimon et al. |
| 6,991,662 B2 | 1/2006 | Visco et al. |
| 7,070,632 B1 | 7/2006 | Visco et al. |
| 7,211,351 B2 | 5/2007 | Klaassen |
| 7,211,532 B2 | 5/2007 | Fu |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,344,804 B2 | 3/2008 | Klaassen |
| 7,390,591 B2 | 6/2008 | Visco et al. |
| 7,432,017 B2 | 10/2008 | Visco et al. |
| 7,491,458 B2 | 2/2009 | Visco et al. |
| 7,608,178 B2 | 10/2009 | De Jonghe et al. |
| 7,645,543 B2 | 1/2010 | Visco et al. |
| 7,666,233 B2 | 2/2010 | Visco et al. |
| 7,771,870 B2 | 8/2010 | Affinito et al. |
| 7,781,108 B2 | 8/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 7,998,626 B2 | 8/2011 | Visco et al. |
| 8,048,571 B2 | 11/2011 | Visco et al. |
| 8,114,171 B2 | 2/2012 | Visco et al. |
| 8,182,943 B2 * | 5/2012 | Visco et al. ............ 429/231.95 |
| 8,202,649 B2 | 6/2012 | Visco et al. |
| 8,323,820 B2 | 12/2012 | Visco et al. |
| 8,334,075 B2 | 12/2012 | Visco et al. |
| 8,389,147 B2 | 3/2013 | Visco et al. |
| 2001/0014420 A1 | 8/2001 | Takeuchi et al. |
| 2001/0028977 A1 | 10/2001 | Kazacos et al. |
| 2001/0041294 A1 | 11/2001 | Chu et al. |
| 2002/0012845 A1 | 1/2002 | Choi et al. |
| 2002/0012846 A1 | 1/2002 | Skotheim et al. |
| 2002/0034688 A1 | 3/2002 | Chu et al. |
| 2002/0068220 A1 | 6/2002 | Wyler |
| 2002/0102465 A1 | 8/2002 | Chen et al. |
| 2002/0106563 A1 | 8/2002 | Okawa |
| 2003/0124433 A1 | 7/2003 | Kim et al. |
| 2003/0190501 A1 | 10/2003 | Rendina |

(56) References Cited

U.S. PATENT DOCUMENTS

| | | | |
|---|---|---|---|
| 2003/0224234 A1 | 12/2003 | Steele et al. |
| 2004/0081894 A1 | 4/2004 | Nimon et al. |
| 2004/0126653 A1 | 7/2004 | Visco et al. |
| 2004/0142244 A1 | 7/2004 | Visco et al. |
| 2004/0185334 A1 | 9/2004 | Iwamoto |
| 2004/0191617 A1 | 9/2004 | Visco et al. |
| 2004/0197641 A1 | 10/2004 | Visco et al. |
| 2005/0095506 A1 | 5/2005 | Klaassen |
| 2005/0100792 A1 | 5/2005 | Visco et al. |
| 2005/0100793 A1 | 5/2005 | De Jonghe et al. |
| 2005/0175894 A1 | 8/2005 | Visco et al. |
| 2005/0186469 A1 | 8/2005 | De Jonghe et al. |
| 2005/0208353 A1 | 9/2005 | Johnson |
| 2006/0046149 A1 | 3/2006 | Yong et al. |
| 2006/0063051 A1 | 3/2006 | Jang |
| 2006/0078790 A1 | 4/2006 | Nimon et al. |
| 2006/0183011 A1 | 8/2006 | Mittelsteadt et al. |
| 2007/0051620 A1 | 3/2007 | Visco et al. |
| 2007/0087269 A1 | 4/2007 | Inda |
| 2007/0117007 A1 | 5/2007 | Visco et al. |
| 2007/0117026 A1 | 5/2007 | Kumar et al. |
| 2007/0172739 A1 | 7/2007 | Visco et al. |
| 2007/0231704 A1 | 10/2007 | Inda |
| 2008/0038641 A1 | 2/2008 | Visco et al. |
| 2008/0052898 A1 | 3/2008 | Visco et al. |
| 2008/0057386 A1 | 3/2008 | Visco et al. |
| 2008/0057387 A1 | 3/2008 | Visco et al. |
| 2008/0057399 A1 | 3/2008 | Visco et al. |
| 2009/0286114 A1 | 11/2009 | Visco et al. |
| 2009/0297935 A1 | 12/2009 | Visco et al. |
| 2010/0104934 A1 | 4/2010 | Visco et al. |
| 2011/0014522 A1 | 1/2011 | Visco et al. |
| 2011/0039144 A1 | 2/2011 | Visco et al. |
| 2011/0269031 A1 | 11/2011 | Visco et al. |
| 2012/0009469 A1 | 1/2012 | Visco et al. |
| 2012/0094188 A1 | 4/2012 | Visco et al. |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 57-003371 | 1/1982 |
| JP | 57-017568 | 1/1982 |
| JP | 62-243247 | 10/1987 |
| JP | 63-198261 | 8/1988 |
| JP | 09-320645 | 12/1997 |
| JP | 2001-351615 | 12/2001 |
| JP | 2002-513991 | 5/2002 |
| JP | 2002-518796 | 6/2002 |
| KR | 10/2001-0024927 | 3/2001 |
| KR | 2001-0043145 | 5/2001 |
| WO | 98/28811 | 7/1998 |
| WO | 99/57770 | 11/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |
| WO | 2004/036669 | 4/2004 |
| WO | 2005/038953 | 4/2005 |
| WO | 2005/038962 | 4/2005 |

OTHER PUBLICATIONS

U.S. Appl. No. 11/092,781, Office Action mailed Jun. 16, 2006.
U.S. Appl No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E-248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium Sources batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O-Al2O3-TiO2-SiO2-P2O5 Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}(PO_4)_3$, M = Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta$=$Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O$-$Al_2O_3$-$TiO_3$-$P_2O_5$", Solid State Ionics, 96 (1997), pp. 195-200.
Fu, Jie, "Fast Li+ ion conducting glass-ceramics in the system $Li_2O$-$Al_2O_3$-$GeO_2$-$P_2O_5$" Solid State Ionics 104 (1997), pp. 191-194.
Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics ($Li_{1+x}M_xTi_{2-x}PO_4)_3$,$M^{3+}$=$Al^{3+}$,$Sc^{3+}$, or $Y^{3+}$)", Chemistry Letters, 1990, pp. 1825-1828.

(56) References Cited

OTHER PUBLICATIONS

Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, $4^{TH}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, mailed Aug. 30, 2007.
CN patent application No. 200480037293.5, Office Action mailed Aug. 22, 2008.
EP patent application No. 04794699.1, Examination Report mailed Aug. 5, 2008.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the $Li_2O$-$Al_2O_3$-$TiO_2$-$P_2O_5$ Glass-Ceramic, *Journal of The Electrochemical Society*, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
U.S. Appl. No. 10/986,441, Notice of Allowance mailed Jun. 19, 2009.
U.S. Appl. No. 10/772,157, Notice of Allowance mailed Sep. 17, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the $42^{nd}$ Power Sources Conference, Jun. 2006, p. 2.14.
Read J., "Electrolyte Formulation and Temperature Performance of the $Li/O_2$ Battery", Proceeding of the $9^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/824,548, Notice of Allowance mailed Dec. 17, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
AU patent application No. 2006280097, Examination Report mailed Jun. 9, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.

(56) References Cited

OTHER PUBLICATIONS

CN patent application No. 200480037293.5, Office Action mailed Jun. 24, 2010.
AU patent application No. 2004306866, Notice of Acceptance mailed Jun. 17, 2010.
U.S. Appl. No. 12/831,066, "Active Metal Fuel Cells", Visco et al., filed Jul. 6, 2010.
U.S. Appl. No. 12/649,245, Office Action mailed Jul. 19, 2010.
U.S. Appl. No. 12/831,066, Office Action mailed Aug. 18, 2010.
U.S. Appl. No. 11/824,597, Notice of Allowance mailed Sep. 9, 2010.
KR patent application No. 10-2005-7006382, Office Action mailed Aug. 31, 2010.
U.S. Appl. No. 12/475,403, Notice of Allowance mailed Oct. 7, 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type $Li_5La_3M_2O_{12}$ (M = Nb, Ta)", J. Am. Chem. Soc. 86 (3) 437-40 (2003), Oct. 21, 2002.
U.S. Appl. No. 12/649,245, Office Action mailed Nov. 30, 2010.
U.S. Appl. No. 11/612,741, Office Action mailed Nov. 29, 2010.
U.S. Appl. No. 11/562,883, Office Action mailed Jan. 19, 2011.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.
KR patent application No. 10-2006-7017692, Notice to Submit Response mailed May 13, 2011.
JP patent application No. 2006-535572, Office Action mailed Jun. 21, 2011.
JP patent application No. 2006-552102, Office Action mailed Jul. 5, 2011.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
U.S. Appl. No. 13/336,459, "Solid State Battery", Visco et al., filed Dec. 23, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action mailed Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
KR patent application No. 9-5-2012-016417008, Notice of Allowance mailed Nov. 23, 2012.
U.S. Appl. No. 13/717,255, "Active Metal Fuel Cells," Visco et al., filed Dec. 17, 2012.
Licht et al., "A solid sulfur cathode for aqueous batteries," *Science*, vol. 261, No. 5124 (Aug. 20, 1993) 1029-1032.
Licht et al., "Investigation of a novel aqueous aluminum/sulfur battery," *Journal of Power Sources*, 45 (1993) 311-323.
U.S. Appl. No. 13/673,789, Office Action mailed Feb. 28, 2013.
U.S. Appl. No. 13/615,351, Office Action mailed Mar. 25, 2013.
CA patent application No. 2,542,304, Office Action mailed Jan. 30, 2013.
U.S. Appl. No. 13/464,835, Office Action mailed May 2, 2013.
International patent application No. PCT/US2009/047278, International Search Report and Written Opinion dated Jan. 21, 2010.
U.S. Appl. No. 12/484,063, "Catholytes for asqueous lithium / air battery cells", Visco et al., filed Jun. 12, 2009.
U.S. Appl. No. 12/484,065, "High energy density aqueous lithium / air battery cells", Visco et al., filed Jun. 12, 2009.
U.S. Appl. No. 12/484,079, "Cathodes and reservoirs for aqueous lithium / air battery cells", Visco et al., filed Jun. 12, 2009.
U.S. Appl. No. 12/484,081, "Hydrogels for aqueous lithium / air battery cells", Visco et al., filed Jun. 12, 2009.
U.S. Appl. No. 12/484,063, Office Action mailed Feb. 6, 2012.
U.S. Appl. No. 12/484,079, Office Action mailed Apr. 27, 2012.
U.S. Appl. No. 12/484,081, Office Action mailed Jun. 21, 2012.
U.S. Appl. No. 12/484,063, Office Action mailed Aug. 1, 2012.
U.S. Appl. No. 12/484,065, Office Action mailed Aug. 9, 2012.
U.S. Appl. No. 12/484,063, Notice of Allowance mailed Sep. 14, 2012.
U.S. Appl. No. 13/663,224, "Catholytes for aqueous lithium/air battery cells," Visco et al., filed Oct. 29, 2012.
U.S. Appl. No. 12/484,081, Notice of Allowance mailed Jan. 18, 2013.
U.S. Appl. No. 12/484,065, Office Action mailed Feb. 19, 2013.
CN patent application No. 200980131906.4, First Office Action mailed Dec. 4, 2012.
MX patent application No. 2010/013888, First Official Action mailed Jan. 25, 2013.
U.S. Appl. No. 12/484,079, Office Action mailed Nov. 29, 2012.
JP patent application No. 2011-513742, Office Action mailed Oct. 8, 2013.
JP patent application No. 2006-552102, Office Action mailed Nov. 26, 2013.

\* cited by examiner

US 8,652,686 B2

SUBSTANTIALLY IMPERVIOUS LITHIUM SUPER ION CONDUCTING MEMBRANES

CROSS-REFERENCE TO RELATED APPLICATIONS

This application is a continuation of prior U.S. application Ser. No. 13/453,964 filed on Apr. 23, 2012, titled SUBSTANTIALLY IMPERVIOUS LITHIUM SUPER ION CONDUCTING MEMBRANES now pending, which is a continuation of U.S. application Ser. No. 11/612,741 filed on Dec. 19, 2006, titled COMPOSITE SOLID ELECTROLYTE MEMBRANES FOR PROTECTION OF ACTIVE METAL ANODES, now issued as U.S. Pat. No. 8,182,943, which in turn claims priority from U.S. Provisional Application No. 60/752,255 filed Dec. 19, 2005, titled COMPOSITE SOLID ELECTROLYTE MEMBRANES FOR PROTECTION OF ACTIVE METAL ANODES, the disclosures of which are incorporated by reference herein.

BACKGROUND OF THE INVENTION

1. Field of the Invention

The present invention relates generally to electrochemical cell components and structures. More particularly, the invention relates to composite solid electrolytes and methods to fabricate composite solid electrolytes, as well as protected anodes and battery cells incorporating the composite solid electrolytes.

2. Related Art

The low equivalent weight of alkali metals, such as lithium, render them particularly attractive as a battery electrode component. Lithium provides greater energy per volume than the traditional battery standards, nickel and cadmium. Unfortunately, no rechargeable lithium metal batteries have yet succeeded in the market place.

An important challenge in the development of rechargeable lithium metal batteries is effective cell cycling. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits that can dislodge from the negative electrode and thereby reduce the battery's capacity.

To address lithium's poor cycling behavior in liquid electrolyte systems, some researchers have proposed coating the electrolyte facing side of the lithium negative electrode with a "protective layer." Such protective layer must conduct lithium ions, but at the same time prevent contact between the lithium electrode surface and the bulk electrolyte. Many techniques for applying protective layers have not succeeded.

Some contemplated lithium metal protective layers are formed in situ by reaction between lithium metal and compounds in the cell's electrolyte that contact the lithium. Most of these in situ films are grown by a controlled chemical reaction after the battery is assembled. Generally, such films have a porous morphology allowing some electrolyte to penetrate to the bare lithium metal surface. Thus, they fail to adequately protect the lithium electrode.

Various pre-formed lithium protective layers have been contemplated. For example, U.S. Pat. No. 5,314,765 (issued to Bates on May 24, 1994) describes an ex situ technique for fabricating a lithium electrode containing a thin layer of sputtered lithium phosphorus oxynitride ("LiPON") or related material. LiPON is a glassy single ion conductor (conducts lithium ion) that has been studied as a potential electrolyte for solid state lithium microbatteries that are fabricated on silicon and used to power integrated circuits (See U.S. Pat. Nos. 5,597,660, 5,567,210, 5,338,625, and 5,512,147, all issued to Bates et al.).

Work in the present applicants' laboratories has developed technology for the use of glassy or amorphous protective layers, such as LiPON, in active metal battery electrodes. (See, for example, U.S. Pat. No. 6,025,094, issued Feb. 15, 2000, U.S. Pat. No. 6,402,795, issued Jun. 11, 2002, U.S. Pat. No. 6,214,061, issued Apr. 10, 2001 and U.S. Pat. No. 6,413,284, issued Jul. 2, 2002, all assigned to PolyPlus Battery Company).

Prior attempts to use lithium anodes in corrosive environments have met with difficulty. Lithium anodes in aqueous environments, for example, relied either on the use of very basic conditions such as use of concentrated aqueous KOH to slow down the corrosion of the Li electrode, or on the use of polymeric coatings on the Li electrode to impede the diffusion of water to the Li electrode surface. In all cases however, there was substantial reaction of the alkali metal electrode with water. In this regard, the prior art teaches that the use of aqueous cathodes or electrolytes with Li-metal anodes is not possible since the breakdown voltage for water is about 1.2 V and a Li/water cell can have a voltage of about 3.0 V. Direct contact between lithium metal and aqueous solutions results in violent parasitic chemical reaction and corrosion of the lithium electrode for no useful purpose. Thus, the focus of research in the lithium metal battery field has been squarely on the development of effective non-aqueous (mostly organic) electrolyte systems.

SUMMARY OF THE INVENTION

In one aspect, the present invention provides a substantially impervious composite solid electrolyte comprising two or more components including a monolithic solid electrolyte base component having metal ion room temperature (RT) conductivity in the range of at least greater than $10^{-6}$ to about $10^{-2}$ S/cm, and at least one more component, a filler component, used to eliminate through-porosity in the solid electrolyte base component. The monolithic solid electrolyte base component (also referred to simply as the base component) is a continuous matrix of an inorganic solid electrolyte metal ion conductor, for example, a sintered ceramic or glass-ceramic membrane. The base component is also porous in that it contains at least residual porosity that remains after initial solid electrolyte fabrication, and at least some of the pores can be characterized as being through pores, in that they provide a pathway for fluids to penetrate from one major surface of the base component to a different major surface. The presence of through-porosity can render the base component permeable (pervious) to fluids, such as air and liquid electrolytes (e.g., non-aqueous and aqueous electrolytes). By impregnating the base component with a filler material that is able to plug the through-pore pathways, through-porosity is eliminated and the composite solid electrolyte of the instant invention is rendered substantially impervious while retaining high metal ion conductivity. By substantially impervious it is meant that the composite solid electrolyte layer provides a barrier to fluids that would be detrimental to its performance or to the performance of devices incorporating the composite if such fluids were allowed to penetrate from one major surface of the composite to a different major surface.

The composite solid electrolyte of the instant invention is generally useful in electrochemical cell structures such as protected anodes and battery cells. In accordance with the present invention and in embodiments whereby the composite is employed as a layer in a protected anode, the conductive metal ion of the composite solid electrolyte is the ion of the active metal of the anode being protected. For example, if the protected anode is a protected lithium anode, the conductive metal ion is Li. When generally used in a battery cell, the conductive metal ion of the composite is the ion of the active metal of the anode employed in the battery cell. For example, if the anode is Li metal, the composite is conductive to Li ions.

The RT metal ion conductivity of the composite solid electrolyte and its solid electrolyte base component are both in the range of at least $10^{-6}$ to about $10^{-2}$ S/cm, and both the composite and its base component conduct the same metal ion. The conductive metal ion can be an alkali metal ion, an alkaline earth ion, or a transition metal ion such as zinc. Preferably, the conductive metal ion is an alkali metal ion (e.g., Li and Na), and most preferably the conductive metal ion is Li.

The solid electrolyte base component is a continuous matrix of an inorganic solid electrolyte that, albeit somewhat porous, provides an intact metal ion conductive network such that the composite solid electrolyte retains high metal ion conductivity even if the filler component is not a metal ion conductor. Typically the base component is at least 50% dense, more preferably greater than 75% dense, and even more preferably greater than 95% dense, relative to the theoretical density of the solid electrolyte base component material.

Importantly, because the base component forms an intact network having high active metal ion conductivity, it is not necessary for the filler component to be a metal ion conductor in order to achieve a composite solid electrolyte of the instant invention having high metal ion conductivity. In a preferred embodiment the conductivity of the composite is within the same order of magnitude (factor of 10) as the conductivity of the base component. For instance, the composite conductivity is not less than about a about tenth ($1/10$) of the conductivity of its base component, preferably it is not less than about a fifth ($1/5$) and more preferably it is not less than about half ($1/2$) the conductivity of the base component. For example, if the base component has metal ion conductivity of $5 \times 10^{-4}$ S/cm, the composite solid electrolyte preferably has conductivity not less than $5 \times 10^{-5}$ S/cm, more preferably not less than about $10^{-5}$ S/cm and even more preferably not less than $2.5 \times 10^{-4}$ S/cm.

The base component material can be any suitable inorganic active metal ion conductor, such as a glass, ceramic or glass-ceramic, and combinations thereof. For instance, the base component can be a sintered ceramic membrane; it can also be a glass or glass ceramic membrane fabricated by melt quench processing.

Suitable solid electrolyte base component materials include glassy or amorphous metal ion conductors, such as a phosphorus-based glass, oxide-based glass, sulpher-based glass, oxide/sulfide based glass, selenide based glass, gallium based glass, germanium-based glass, Nasiglass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Na superionic conductor (NASICON), and Li superionic conductor (LISICON) and the like; as well as glass ceramic active metal ion conductors. Specific examples include, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ ($0.0 \le x \le 0.9$) and crystallographically related structures, $Na_3Zr_2Si_2PO_{12}$, $Li_3Zr_2Si_2P_3O_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.7}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$, $Li_4NbP_3O_{12}$, $Li_5La_3Ta_2O_{12}$, $Li_5La_3Nb_2O_{12}$ and combinations thereof, optionally sintered or melted. Suitable ceramic ion alkali metal ion conductors are described, for example, in U.S. Pat. No. 4,985,317 to Adachi et al., incorporated by reference herein in its entirety and for all purposes.

Further specific examples of suitable solid electrolyte base component materials include ceramic and glass ceramic active metal ion conductors based on LiSICON, particularly the lithium metal phosphates for example lithium hafnium phosphates (e.g., $LiHf_2(PO_4)_3$), lithium titanium phosphates (e.g., $LiTi_2(PO_4)_3$) and lithium germanium phosphates (e.g., $LiGe_2(PO_4)_3$) and combinations thereof and their crystallographically related structures; further examples of these materials include $Li_{1+x+r}(Ti_{2-y}Ge_y)_{2-x}(Al_{2-z}Ga_z)_xSi_rP_{3-y}O_{12}$, $Li_{1+x+r}(Ti_{2-y}Hf_y)_{2-x}(Al_{2-z}Ga_z)_xSi_rP_{3-y}O_{12}$, $Li_{1+x+r}(Ge_{2-y}Hf_y)_{2-x}(Al_{2-z}Ga_z)_xSi_rP_{3-y}O_{12}$, $Li_{1+x}Hf_{2-x}Al_x(PO_4)_3$ ($0.1 \le x \le 0.9$), $Li_{1+x}Ge_{2-x}Al_x(PO_4)_3$ ($0.0 \le x \le 0.9$), $Li_2Ge_{2-x}Ti_x(PO_4)_3$ ($0.0 \le x \le 2.0$) and $Li_2TiGe(PO_4)_3$.

In one embodiment, the solid electrolyte base component comprises a ceramic or glass-ceramic solid electrolyte material of Li super ionic conducting lithium metal phosphates. Such solid electrolytes according to the present invention include lithium hafnium phosphate (e.g., $LiHf_2(PO_4)_3$), lithium titanium phosphate (e.g., $LiTi_2(PO_4)_3$), and lithium germanium phosphates (e.g., $LiGe_2(PO_4)_3$).

In a preferred embodiment, the solid electrolyte base component comprises a material having the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and contains a predominant crystalline phase composed of $Li_{1+x}(M,Al,G)_x(Ge_{1-y}Ti_y)_{2-x}(PO_4)_3$ where $x \le 0.8$ and $0 \le y \le 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < x \le 0.4$ and $0 < y \le 0.6$, and where Q is Al or Ga.

In another preferred embodiment, the solid electrolyte base component comprises a ceramic or glass-ceramic solid electrolyte material based on lithium hafnium phosphate. Such solid electrolytes according to current invention include compounds with a general formula of $Li_{1+x}M_{2-x}M_xHf_{2-x}(PO_4)_3$, where M is Cr, In, Fe, Ta, Sc, Lu or Y, and where $0 < x \le 0.5$.

In yet another preferred embodiment, the solid electrolyte base component comprises a ceramic solid electrolyte material based on perovskite ($ABO_3$)-type lithium lanthanum titanate with a nominal formula $Li_{3x}La_{(2/3)-x}TiO_3$ ($0 < x < 0.16$) and materials structurally related to it. When the value of x is close to 0.1, lithium lanthanum titanate has the highest conductivity. In the preferred case lithium lanthanum titanate is in the form of a ceramic layer.

The filler component effectively closes off through-pore pathways, eliminating through-porosity in the base component, and rendering the composite solid electrolyte a substantially impervious barrier to fluids, including air and aqueous and non-aqueous electrolytes, catholytes or solvents. The filler component should adhere well to the base component and provide a substantially impervious fluid barrier to materials that it comes in contact with during device operation such as liquid or gel phase electrolytes. Because the base component forms an intact network of an inorganic active metal ion conductor the filler component is not required to be an ion conductor in order to achieve a composite solid electrolyte having high metal ion conductivity. Accordingly, the filler component can be conductive or non-conductive of metal ions.

The filler component may comprise any suitable material such as polymers, ceramics, glasses, glass-ceramics and metals. Generally, the filler component comprises an organic polymer since such materials can have desirable process flow characteristics and can provide good surface adhesion to the base component. The filler component should be chosen such that it is chemically compatible with components that it will be in contact with during device operation such that it remains substantially impervious. By "chemical compatibility" (or "chemically compatible") it is also meant that the referenced material does not react to form a product that is deleterious to device (e.g., battery cell) operation when contacted with one or more other referenced device components or manufacturing, handling or storage conditions.

In one embodiment the filler component comprises a polymer non-conductive to metal ions. Suitable non-conductive polymeric filler materials include polyisobutylene, epoxy, polyethylene, polypropylene, polytetrafluoroethylene and combinations thereof.

In an alternative embodiment, the filler component comprises a metal ion conductive polymer, for example a solid (dry) polymer electrolyte that conducts Li cations. The metal ion conductive polymer electrolyte can be based on a salt of an anode active metal, e.g., a Li salt, and polyethylene oxide (PEO), crosslinked PEO, or amorphous PEO or combinations thereof.

In certain instances it is advantageous to also incorporate an inorganic material into the filler component, such as a ceramic, glass or glass-ceramic, which can improve mechanical strength and thermal properties of the composite. Suitable inorganic filler materials include oxides such as $Al_2O_3$, $ZrO_2$, $SiO_2$, $CeO_2$, $Al_2TiO_5$ and combinations thereof.

In another aspect, the present invention provides a method to eliminate through-pores by impregnating a continuous matrix of an inorganic metal ion conducting solid electrolyte base component with filler material to form a filler component such as a polymer, for example epoxy. In this way a solid electrolyte produced by any process that yields through-porosity (e.g., residual porosity) can be modified through the incorporation of a filler to form a composite solid electrolyte and eliminate through-porosity in the base solid electrolyte component. The impregnation methods include but are not limited to impregnation, impregnation under vacuum and thermoplastic infusion.

In one method, a monomer is impregnated into the pores of the base component and then polymerized (cured), for example by thermal, irradiative (including photo), and/or e-beam curing. In an alternative method, an epoxy and a hardener are impregnated and the epoxy is hardened once it has infiltrated the pore structure. In another method a low viscosity solvent is impregnated into the pores followed by sequential impregnation steps with the solvent having increasing concentration of epoxy.

The methods of the instant invention also include a surface treatment of the solid electrolyte composite. For instance, following filler impregnation the composite is subjected to a surface treatment to clean up remnant filler component that may have formed on the surface of the base component. Surface treatment methods include, ultra-violet ozone cleaning (UVOC), plasma etching, and/or mechanical grinding.

The present invention also provides protected active metal anodes protected with an ionically conductive protective membrane architecture incorporating the composite solid electrolyte of the instant invention as a substantially impervious component. This protective membrane architecture prevents the active metal from deleterious reaction with the environment on the other (cathode) side of the architecture, which may include aqueous, air or organic liquid electrolytes and/or electrochemically active materials.

The architecture includes an active metal (e.g., lithium) ion conductive impervious component comprising the inventive composite solid electrolyte that is compatible with active metal corrosive environments, separated from an anode active material (e.g., alkali metals, such as lithium), active metal intercalation (e.g., lithium-carbon, carbon) and active metal alloys (e.g., lithium-tin) alloys or alloying metals (e.g., tin) by another component that is chemically compatible with the active metal. This protective architecture prevents the active metal from deleterious reaction with the environment on the other (cathode) side of the impervious layer, which may include aqueous, air or organic liquid electrolytes and/or electrochemically active materials that are corrosive to the active metal.

In some embodiments, the inventive composite solid electrolyte can be, or form part of, the substantially impervious (second) component in a solid state laminate protective membrane architecture of the sort described in described in commonly assigned U.S. patent application Ser. No. 10/772,157, filed Feb. 3, 2004; Ser. No. 10/825,587, filed Apr. 14, 2004; and Ser. No. 10/772,228, filed Feb. 3, 2004; incorporated by reference herein in their entirety and for all purposes, which also includes an active metal ion conducting solid material compatible with active metal (e.g., lithium). Thus, the composite solid electrolyte of the instant invention finds use in the applications described therein.

In other embodiments, the inventive composite solid electrolyte can be, or form part of, the substantially impervious component in a ionically conductive partially solid state protective membrane architecture having an interlayer, such as are described in U.S. patent application Ser. No. 10/824,944, filed Apr. 14, 2004, incorporated by reference herein in its entirety and for all purposes, which also includes an active metal ion conducting separator compatible with active metal (e.g., lithium) containing a non-aqueous anolyte, e.g., liquid, solid polymer, or gel electrolyte. Thus, again, the composite solid electrolyte of the instant invention finds use in the applications described therein as well.

In various aspects the invention relates to a protected anode, comprising: an active metal anode having a first surface and a second surface; and a protective membrane architecture on the first surface of the anode, the architecture having a first component ionically conductive and chemically compatible with the active metal on a side in contact with the active metal anode, and second component substantially impervious, ionically conductive and chemically compatible with active metal corrosive environments on the other side; wherein the architecture comprises the inventive composite solid electrolyte of the instant invention.

In some aspects of the protected anode the protective membrane architecture comprises a laminate, the laminate comprising, a first material layer in contact with the anode, the first material layer being ionically conductive and chemically compatible with the active metal; and a second material layer in contact with the first material layer, the second material layer comprising the inventive composite solid electrolyte of the instant invention and being substantially impervious, ionically conductive and chemically compatible with the first material layer and active metal corrosive environments; wherein the ionic conductivity of the laminate is at least $10^{-7}$ S/cm. The laminate may have a discrete or graded interface between material layers.

In other aspects of the protected anode the protective membrane architecture comprises: an ionically conductive protective membrane architecture on a first surface of the anode the architecture comprising, an active metal ion conducting separator layer comprising a non-aqueous anolyte, the separator layer being chemically compatible with the active metal, and in contact with the anode, and a substantially impervious ionically conductive layer, comprising the inventive composite solid electrolyte of the instant invention, chemically compatible with the separator layer and with aqueous environments, and in contact with the separator layer. Various electrochemical cells, including battery cells, incorporating the protected anodes in accordance with the present invention are also provided.

In another aspect the present invention provides battery cells incorporating protected anodes of the instant invention paired with a cathode system, including aqueous and non-aqueous cathode systems. The battery cells incorporating the protected anodes of the instant invention may have various configurations, including prismatic and cylindrical, and compositions, including active metal ion, alloy and intercalation anodes, aqueous, water, air, metal hydride and metal oxide cathodes, and aqueous, organic or ionic liquid catholytes; electrolyte (anolyte and/or catholyte) compositions to enhance the safety and/or performance of the cells; and fabrication techniques. Examples of battery cell embodiments of the instant invention include active metal/aqueous cells, active metal water cells, active metal/air cells, active metal/metal hydride cells. The present invention also provides methods of making the battery cells.

Other aspects of the invention include:

A protective laminate battery separator, comprising: an ionically conductive first material or precursor that is chemically compatible with an active metal and air; and a second material in contact with the first material, the second material comprising the inventive composite solid electrolyte and being substantially impervious, ionically conductive and chemically compatible with the first material and active metal corrosive environments.

A method of fabricating protected anodes, the method comprising: providing a protective membrane architecture, the architecture being ionically conductive and chemically compatible with an active metal on a first side, and substantially impervious, ionically conductive and chemically compatible with active metal corrosive environments on the other side, the architecture comprising the inventive composite solid electrolyte; applying an active metal material to the first side of the membrane architecture to form an active metal anode.

These and other aspects of the present invention are described in more detail in the description that follows.

DETAILED DESCRIPTION OF THE INVENTION

The present invention offers significant advantages in the design of batteries or other electrochemical devices and structures such as protected anodes using solid electrolytes where any residual through-porosity remaining after initial electrolyte fabrication processing is filled with a suitable filler component. In the instant invention, composite solid electrolytes comprise two or more components including a monolithic solid electrolyte base component (also referred to simply as the base component) having metal ion conductivity in the range of at least $10^{-6}$ to about $10^{-2}$ S/cm and at least one more component, used to eliminate through-porosity in the solid electrolyte structure. In this way a solid electrolyte produced by any process that yields residual through-porosity can be modified by the incorporation of a filler to form a substantially impervious composite solid electrolyte and eliminate through-porosity in the base component.

The composite solid electrolyte is generally useful in electrochemical cell structures such as protected anodes and battery cells. In accordance with the instant invention and in embodiments whereby the composite is employed as a component in a protected anode, the conductive metal ion of the composite solid electrolyte is the active metal ion of the active metal of the anode being protected. For example, if the protected anode is Li, the active metal conductive ion of the composite solid electrolyte is Li ion. When generally used in a battery cell, the conductive metal ion of the composite is the ion of the active metal of the anode. For example, if the anode is Li metal, the composite is conductive to Li ions.

The composite solid electrolyte of the instant invention is now described in more detail with reference to FIG. 1A-B and specific embodiments.

Figure 1A:
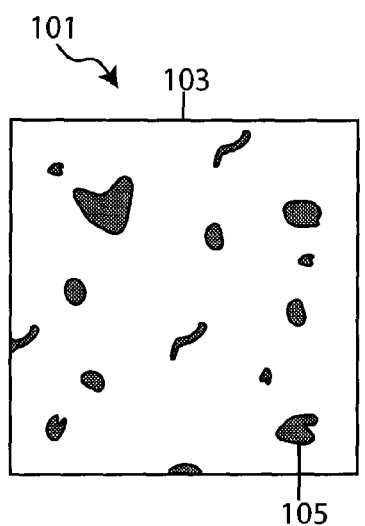
FIG. 1A-B illustrates a top down (A) and cross sectional (B) view of a schematic drawing (not drawn to scale) of a composite solid electrolyte in accordance with the instant invention.
Figure 1B:
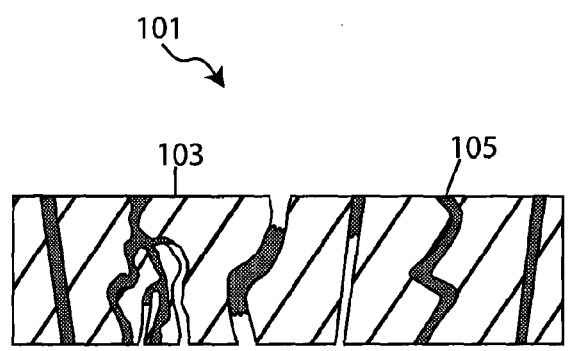

Referring to FIG. 1A-B, there is provided a schematic illustration of a composite solid electrolyte in accordance with the present invention. The figures are not drawn to scale in order not to obscure important features. FIG. 1A shows the composite 101 in a top down view and FIG. 1B shows the composite in cross-section. The composite 101 is composed of a highly ionically conductive monolithic solid electrolyte base component 103, filled with a filler component 105 that may or may not be highly ionically conductive. The filler component 105 effectively closes through-pores eliminating through-porosity residual from the manufacturing of the base component 103 to form a composite that is substantially impervious to fluids.

By substantially impervious it is meant that the composite solid electrolyte provides a sufficient barrier to fluids that if otherwise allowed to penetrate through the composite, from one major surface to a different major surface, would be detrimental to its utility in devices such as protected anodes and battery cells. For instance, in the context of a protected anode, by substantially impervious it is meant that the composite provides a sufficient barrier to battery electrolytes and solvents and other battery component materials (e.g., electrochemically active gaseous components such as air) that would be damaging to the active metal anode to prevent any such damage that would degrade protected anode performance from occurring.

The monolithic solid electrolyte base component 103 is a continuous matrix of an inorganic solid electrolyte metal ion conductor, for example, a sintered ceramic or glass-ceramic membrane. The base component is non-swellable but is porous in that it contains at least residual porosity that remains after initial solid electrolyte fabrication, and at least some of the pores can be characterized as through-pores, in that they provide a pathway for fluids to penetrate through from one major surface of the base component to a different major surface. The presence of through-porosity renders the base component pervious to fluids, such as air and liquid electrolytes (e.g., non-aqueous and aqueous electrolytes). By impregnating the base component with filler material to form a filler component 105 that is able to plug the pathways and effectively close off through-porosity, the composite solid electrolyte of the instant invention is rendered substantially impervious while retaining active metal ion conductivity. The composite solid electrolyte has room temperature (RT) metal ion conductivity in the range of at least $10^{-6}$ to about $10^{-2}$ S/cm (for example, about $10^{-6}$, $10^{-5}$, $10^{-4}$, $10^{-3}$, $10^{-2}$ or values intermediate S/cm).

The Base Component

The monolithic solid electrolyte base component is a continuous matrix of an inorganic solid electrolyte metal ion conductor. The base component is porous but non-swellable. For instance, the base component may be a sintered ceramic or glass ceramic membrane. It should be noted that because the base component forms an intact metal ion conductive network the high ionic conductivity of the inventive composite is retained following filling, even if the filler component is not metal ion conductive.

The solid electrolyte base component is not completely dense. The porosity of the base component, which generally forms during solid electrolyte fabrication and processing, comprises through-pores and may comprise other types of pores such as dead end pores including non-connected cavities on the surface or isolated cavities in the bulk. The total porosity of the base component refers to the total volume fraction of all pores. Whereas through porosity refers to the fraction of the total volume of the base component in which fluid flow can effectively take place. Accordingly, through pores provide a pathway across the base component from one major surface to an opposing major surface. Generally, through-pores may take on any form (e.g., a hole or crevice), shape or dimension. The through pore dimensions of the base component are typically in the range of 1 mm to less than sub-micron size, more typically less than 10 microns, and even more typically less than 1 micron.

A significant advantage of the composite solid electrolyte of the instant invention is the high metal ion conductivity of the base component that among other things enables a broad range of useful thickness for the composite. Generally, it is desirable to minimize thickness of the composite while maintaining mechanical integrity and substantial imperviousness. The minimal thickness of the composite is determined by the eventual thickness of the base component, which is restricted, in part, by the process used to fabricate the base component and the process used to eliminate through-porosity. The thickness of the composite is also determined by the ability to maintain substantial imperviousness under device operating conditions. To maintain mechanical integrity and substantial imperviousness during processing, fabrication and device operation, the composite solid electrolyte of the instant invention generally has thickness in the range of 10 to 1000 microns, and preferably in the range of 10 to 500 microns and more preferably in the range of 10 to 50 microns.

The metal ion RT conductivity of the composite solid electrolyte and its solid electrolyte base component are both in the range of at least $10^{-6}$ to about $10^{-2}$ S/cm. The conductive metal ion of the composite solid electrolyte and of its base component is the same metal ion; it can be an alkali metal ion, an alkaline earth ion, or a transition metal ion such as zinc. Preferably, the conductive metal ion is an alkali metal ion (e.g., Li, Na, K), and most preferably the conductive metal ion is Li.

The base component has active metal ion room temperature (RT) conductivity in the range of at least $10^{-6}$ to about $10^{-2}$ S/cm (for example, about $10^{-6}$, $10^{-5}$, $10^{-4}$, $10^{-3}$, $10^{-2}$ or values intermediate S/cm).

The base component is a continuous matrix of an inorganic solid electrolyte that, albeit somewhat porous, provides an intact metal ion conductive network such that the composite solid electrolyte retains high metal ion conductivity even if the filler component is not a metal ion conductor. Enhanced performance is achieved by maximizing the content of the highly ionically conductive base component in the composite solid electrolyte. Thus, in one embodiment, the density of the base component (e.g., glass ceramic membrane) is greater than 50% and less than 75% of the theoretical density of the base component material (e.g., glass ceramic material). Accordingly, the volume of pores, which need to be filled with the filler component, is between 50% and 25%. In another preferred embodiment, the density of the ceramic matrix is greater than 75% and less than 95%. In an even more preferred embodiment, the density of the ceramic matrix is greater than 95% of the theoretical density of the base component material, so the volume of pores filled with the filler component is less than 5%.

Because the base component forms an intact network having high active metal ion conductivity, it is not necessary for the filler component to be a metal ion conductor in order to achieve a composite solid electrolyte having high metal ion conductivity. In a preferred embodiment the conductivity of the composite is within the same order of magnitude (factor of 10) as the conductivity of its base component. For instance, the composite conductivity is not less than about a tenth ($\frac{1}{10}$) of the conductivity of its base component, preferably it is not less than about a fifth ($\frac{1}{5}$) and more preferably it is not less than about half ($\frac{1}{2}$) the conductivity of its base component. For example, if the base component has active metal ion conductivity of $5 \times 10^{-4}$ S/cm, the composite solid electrolyte, made by impregnating the base component with a filler material, preferably has conductivity not less than $5 \times 10^{-5}$ S/cm, more preferably not less than about $10^{-5}$ S/cm and even more preferably not less than $2.5 \times 10^{-4}$ S/cm.

The base component can be in the form of a ceramic, glass-ceramic or glassy solid electrolyte. For instance, in the case of a ceramic base component, the porous (less than 100% dense) ceramic matrix can be formed using various techniques traditionally employed for processing of ceramics, such as die pressing of powders, sintering and hot pressing, cold and hot isostatic pressing, tape casting and others. After the ceramic matrix base component is formed, its pores can be filled directly with filler material to form the filler component (e.g., a polymer), rendering the composite substantially impervious. Furthermore, the base component can be compositionally homogenous or compositionally graded for example in a direction along the thickness of the composite solid electrolyte.

Suitable solid electrolyte base component materials include glassy or amorphous metal ion conductors, such as a phosphorus-based glass, oxide-based glass, sulpher-based glass, oxide/sulfide based glass, selenide based glass, gallium based glass, germanium-based glass, Nasiglass or boracite glass (such as are described D. P. Button et al., Solid State Ionics, Vols. 9-10, Part 1, 585-592 (December 1983); ceramic active metal ion conductors, such as lithium beta-alumina, sodium beta-alumina, Na superionic conductor (NASICON), and Li superionic conductor (LISICON) and the like; as well as glass ceramic active metal ion conductors. Specific examples include, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ ($0.0 \leq x \leq 0.9$) and crystallographically related structures, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.7}TiO_3$, $Na_5MSi_4O_{12}$ (M: rare earth such as Nd, Gd, Dy) $Li_5ZrP_3O_{12}$, $Li_5TiP_3O_{12}$, $Li_3Fe_2P_3O_{12}$, $Li_4NbP_3O_{12}$, $Li_5La_3Ta_2O_{12}$, $Li_5La_3Nb_2O_{12}$ and combinations thereof, optionally sintered or melted. Suitable ceramic ion alkali metal ion conductors are described, for example, in U.S. Pat. No. 4,985,317 to Adachi et al., incorporated by reference herein in its entirety and for all purposes.

Further specific examples of suitable solid electrolyte base component materials include ceramic and glass ceramic active metal ion conductors based on LiSICON, particularly the lithium metal phosphates for example lithium hafnium phosphates (e.g., $LiHf_2(PO_4)_3$), lithium titanium phosphates (e.g., $LiTi_2(PO_4)_3$) and lithium germanium phosphates (e.g., $LiGe_2(PO_4)_3$) and combinations thereof and their crystallographically related structures; further examples of these materials include $Li_{1+x+r}(Ti_{2-y}Ge_y)_{2-x}(Al_{2-z}Ga_z)_xSi_rP_{3-y}O_{12}$, $Li_{1+x+r}(Ti_{2-y}Hf_y)_{2-x}(Al_{2-z}Ga_z)_xSi_rP_{3-y}O_{12}$, $Li_{1+x+r}(Ge_{2-y}Hf_y)_{2-x}(Al_{2-z}Ga_z)_xSi_rP_{3-y}O_{12}$, $Li_{1+x}Hf_{2-x}Al_x(PO_4)_3$ ($0.1 \leq x \leq 0.9$), $Li_{1+x}Ge_{2-x}Al_x(PO_4)_3$ ($0.0 \leq x \leq 0.9$), $Li_2Ge_{2-x}Ti_x(PO_4)_3$ ($0.0 \leq x \leq 2.0$) and $Li_2TiGe(PO_4)_3$.

In a preferred embodiment, the ion-conductive solid electrolyte base component has the following composition:

| Composition | mol % |
| --- | --- |
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and contains a predominant crystalline phase composed of $Li_{1+x}(M,Al,Ga)_x(Ge_{1-y}Ti_y)_{2-x}(PO_4)_3$ where $x \leq 0.8$ and $0 \leq y \leq 1.0$, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where $0 < x \leq 0.4$ and $0 < y \leq 0.6$, and where Q is Al or Ga.

In another preferred embodiment, the solid electrolyte base component comprises a ceramic or glass-ceramic solid electrolyte material based on lithium hafnium phosphate. Such solid electrolytes according to current invention include compounds with a general formula of $Li_{1+x}M_xHf_{2-x}(PO_4)_3$, where M is Cr, In, Fe, Ta, Sc, Lu or Y, and where $0 < x \leq 0.5$.

In yet another embodiment, the solid electrolyte membrane comprises the glassy, ceramic or glass-ceramic solid electrolyte material based on perovskite ($ABO_3$)-type lithium lanthanum titanate with a nominal formula $Li_{3x}La_{(2/3)-x}TiO_3$ ($0 < x < 0.16$) and materials structurally related to it. When the value of x is close to 0.1, lithium lanthanum titanate has the highest conductivity. In the preferred case lithium lanthanum titanate is in the form of ceramic membrane.

The Filler Component.

Importantly, in the current invention a continuous inorganic metal ion-conducting matrix needs to be formed by the solid electrolyte base component so that ion migration can occur through the base component. The main requirement of the filler component is to eliminate through-porosity by effectively closing off through-pores in the base component, thereby rendering the composite solid electrolyte a substantially impervious fluid barrier with high metal ion conductivity of at least greater than $10^{-6}$ S/cm. The filler component should adhere well to the base component and be substantially impervious to constituents about the surface of the composite that it comes in contact with during device operation, such as liquid or gel electrolytes (anolytes and catholytes). The filler component may also fill dead end pores, such as cavities on the surface of the base component. Because the base component forms an intact network of an inorganic active metal ion conductor it is not necessary for the filler component to be an ion conductor in order to achieve a composite solid electrolyte having high metal ion conductivity.

The filler component may comprise any suitable material such as polymers, ceramics, glasses and metals. Generally, the filler component comprises an organic polymer since such materials can provide good surface adhesion to the base component.

In one embodiment the composite comprises an organic polymer filler component that is not conductive to metal ions. Suitable non-conductive organic polymer filler material include polyisobutylene, epoxy, polyethylene, polypropylene, polytetrafluoroethylene and combinations thereof.

In an alternative embodiment, the filler component comprises a metal ion conductive organic polymer, for example a solid (dry) polymer electrolyte that conducts Li ions. The metal ion conductive polymer electrolyte can be based on a salt of an anode active metal, e.g., a Li salt, and polyethylene oxide (PEO), crosslinked PEO, or amorphous PEO or combinations thereof.

In certain instances it is advantageous to also incorporate an inorganic material into the filler component, such as a ceramic, glass or glass-ceramic, which can improve mechanical strength and thermal properties of the composite. Suitable inorganic filler materials include oxides such as $Al_2O_3$, $ZrO_2$, $SiO_2$, $CeO_2$, $Al_2TiO_5$ and combinations thereof. Generally these inorganic fillers materials are present in the filler component as particles, for example as powders or fibers.

The base component can be impregnated with filler from any and all base component surfaces, simultaneously or sequentially. Generally, the base component is impregnated with filler from all surfaces simultaneously. For instance, the base component may be impregnated sequentially from one major surface with certain filler material and then from the opposing major surface with different filler material. This method can lead to a composite embodiment having a filler component with one type of filler material in contact with the environment about one major surface and a different filler material in contact with the environment about the opposing surface.

In another embodiment the composite solid electrolyte contains a filler component comprising both a non-conductive polymer filler material and a metal ion (e.g., Li) conductive solid (dry) polymer electrolyte filler. For example, the interior of the composite layer can comprise a dry ionically conductive polymer electrolyte filler material, which does not have to be directly chemically compatible to liquid or gel electrolytes (anolytes and catholytes), and one or both surface layers of the composite are impregnated with an inert non-conductive polymer, which is chemically compatible and substantially impervious to anolytes and catholytes. The inclusion of an ionically conductive polymer in the interior of the composite matrix is to improve the total ionic conductivity of the composite.

During impregnation, the through-pores of the base component are filled with filler material to form a filler component that is substantially impervious and leads to the formation of a substantially impervious composite solid electrolyte. It is not necessary for the filler component to completely fill the entirety of the through pores, but rather enough to close the through-pores and eliminate through porosity such that the composite is rendered substantially impervious and retains substantial imperviousness over the useful life of the device for which the composite is incorporated. In some embodiments it is advantageous to process the base component such that the filler component effectively planarize at least one composite surface, for example by having filler component up to the pore brim. This can provide an improved and smoother surface morphology that can facilitate deposition of subsequent functional material layers and improve electrochemical as well as mechanical properties. For example, having a smooth surface facilitates the deposition of a crack and pinhole free solid phase anode compatible material layer on the surface of the composite solid electrolyte layer, useful in the fabrication of some embodiments of protected anodes of the instant invention.

The following methods of filling a solid electrolyte base component with filler material or of the filler material formation directly in the pores of the base component can be used:
1. Vacuum impregnation of the base component with a polymeric material dissolved in an appropriate solvent (liquid carrier) followed by removal of the solvent by drying. Examples of such polymers are polyethylene dissolved in N-Octane at temperature over 80° C. and polyisobutylene dissolved in N-Heptane at room temperature.
2. Thermoplastic infusion of the polymer into the pores of the base component.
3. Impregnation of the base component with a monomer containing initiators of polymerization, followed by in situ thermal, irradiative (including photo), and/or e-beam curing. In general, if the pores of the ceramic matrix need to be impregnated with two or more compounds to form a polymeric material with desirable properties, it can be done in several ways. In particular, the compounds can be delivered into the pores at the same time (using one or both sides of the base component layer) or sequentially.
4. Impregnation of the base component with a mixture containing an epoxy resin and one or more hardeners and accelerators followed by a treatment (in one embodiment, by a heat treatment) to achieve satisfactory hardness. In particular, some commercially available epoxy resins and embedding media used for embedding of specimens in electron and light microscopy can be used to achieve the goals of the current invention.

With further regard to this fourth method, filling of the pores in the base component layer with a mixture based on epoxy resin can be achieved with various methods. One method is based on filling the base component through pores with a low viscosity solvent first, and then sequentially replacing the solvent in the pores with the mixtures containing increasing concentrations of the epoxy (with hardeners and accelerators) and decreasing concentrations of the original solvent, so that the final mixture contains only the epoxy resin (plus hardeners and accelerators) and does not contain the solvent. Another important method of filling the through-pores (including sub-micron through-pores) of the base component layer is based on impregnation of the base component layer with epoxy under vacuum.

After hardening, a thin polymeric layer (or spots of the polymer) may stay on the surface(s) of the base component. The remaining polymer can be removed by grinding the membrane surfaces, for example using abrasive powders and slurries. Thin remaining polymeric layers can also be removed with plasma etching or ultra violet ozone cleaning (UVOC) of the composite layer surface(s).

Protected Anodes

The composite solid electrolyte of the instant invention is generally useful in electrochemical cell structures as a solid electrolyte layer in a battery cell. It may also be used to protect active metal anodes since the composite has high active metal ion conductivity and can provide a substantially impervious fluid barrier. For instance, the composite solid electrolyte of the instant invention has utility as a material layer in protected anodes whereby an active metal anode is protected from adverse reaction with aggressive environments by protective membrane architectures. Such aggressive environments include air, moisture, and battery cell components that are incompatible in contact with the anode (e.g., aqueous and non-aqueous catholyte).

Protective membrane architectures, protected anodes incorporating protective membrane architectures and battery cells incorporating protected anodes having protective membrane architectures are described in commonly assigned U.S. application Ser. Nos. 10/772,157, filed Feb. 3, 2004 and 10/824,944, filed Apr. 14, 2004, and make reference to a substantially impervious solid electrolyte layer (also referred to in these applications as the second material layer or second component) that is a barrier to ambient air, moisture as well as cathode side environments such as battery electrolyte. In accordance with the present invention, the composite solid electrolyte of the instant invention provides an alternative substantially impervious solid electrolyte layer for the above referenced protective membrane architectures and their corresponding protected anodes and battery cells.

Figure 2:
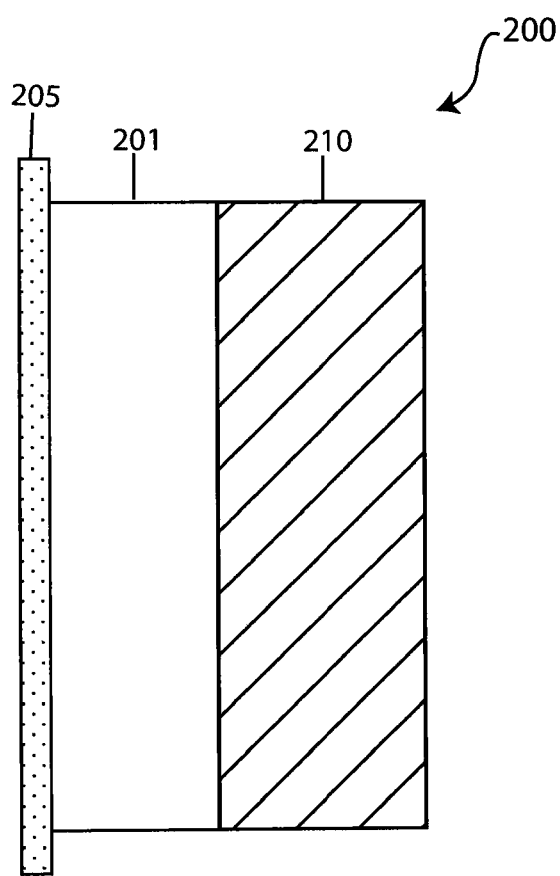
FIG. 2 illustrates a cross sectional depiction of a protected anode in accordance with the present invention.

Referring to FIG. 2 there is illustrated an un-scaled depiction of a protected anode 200 in accordance with the instant invention comprising an active metal anode 201 having two major surfaces, and a protective membrane architecture 210 having a first and second surface whereby the first membrane surface is in direct contact with at least one major surface of the anode 201 and the second membrane surface is in contact with the environment on the side of the protected anode opposite the anode. The protective membrane architecture 210 selectively transports the active metal ion of the anode while providing a substantially impervious barrier that prevents constituents on the side of the protected anode opposite the anode (also referred to as the environment external to the protected anode) from contacting the active metal anode. Generally, the environment external to the protected anode 200 can be air, moisture, and battery components such as the cathode environment including battery electrolytes, such as aqueous and non-aqueous catholyte. The first surface of the protective membrane architecture 210 is chemically compatible with the active metal anode in contact with the anode. The second surface of the protective membrane architecture 210 is chemically compatible with and substantially impervious to constituents of the environment external to the protected anode. The protected anode 200 may optionally have a current collector 205 on the second major surface of the anode 201.

In an alternative embodiment, the protected anode may optionally include a second protective membrane architecture having its first membrane surface in contact with the second major surface of the anode. Since both major surfaces of the protected anode have protective membrane architectures, this embodiment is generally referred to as double-sided protected anode.

The active metal anode 201 can comprise active metal (e.g., alkali metals, such as lithium), active metal intercalation (e.g. lithium-carbon, carbon) and active metal alloys (e.g., lithium-tin) alloys or alloying metals (e.g., tin). Active metals are highly reactive in ambient conditions and can benefit from a barrier layer when used as electrodes. They are generally alkali metals (e.g., lithium, sodium or potassium), alkaline earth metals (e.g., calcium or magnesium), and/or certain transitional metals (e.g., zinc), and/or alloys of two or more of these. The following active metals may be used: alkali metals (e.g., Li, Na, K), alkaline earth metals (e.g., Ca, Mg, Ba), or binary or ternary alkali metal alloys with Ca, Mg, Sn, Ag, Zn, Bi, Al, Cd, Ga, In. Preferred alloys include lithium aluminum alloys, lithium silicon alloys, lithium tin alloys, lithium silver alloys, and sodium lead alloys (e.g., $Na_4Pb$). A preferred active metal electrode is composed of lithium.

Figure 3A:
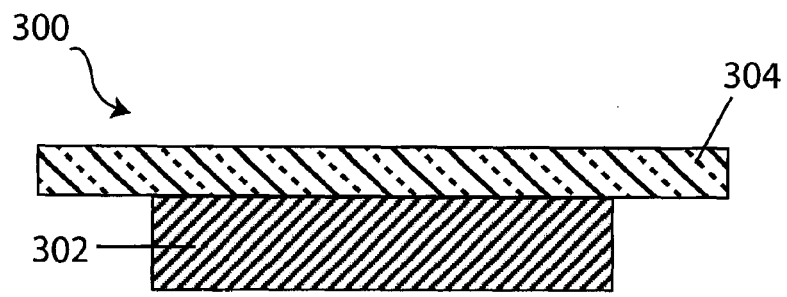
FIG. 3A-C illustrate various alternative configurations of a protected anode and its corresponding protective membrane architecture incorporating a composite solid electrolyte in accordance with the present invention.
Figure 3B:
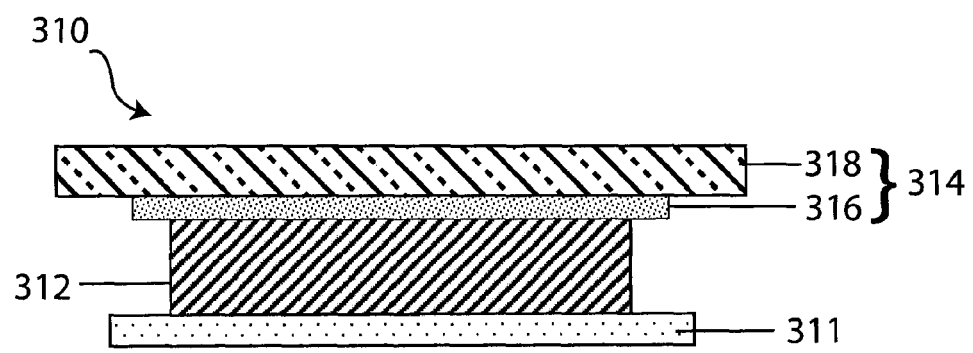
Figure 3C:
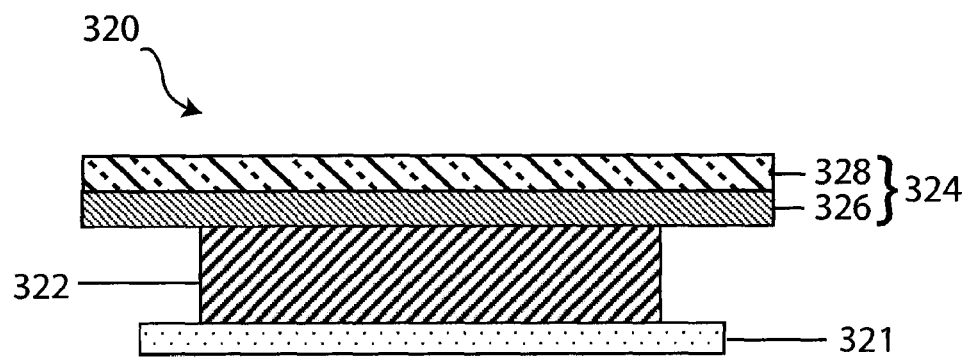

Further details of protected anode embodiments in accordance with the present invention are described forthwith with reference to FIGS. 3A-C. These figures illustrate cross sectional depictions of protected anodes and provide further details on their corresponding protective membrane architectures.

Referring to the protected anode 300 as depicted in FIG. 3A, the protective membrane architecture is simply the inventive composite solid electrolyte 304 of the instant invention as described above, adjacent to and in direct contact with the active metal anode 302. In this embodiment the composite solid electrolyte provides active metal ion transport and is chemically stable to both the active metal anode 302 and the cathode environment.

More commonly, the protective membrane architecture is composed of at least two layers of different materials having different chemical compatibility requirements, one chemically compatible with the anode, the other chemically compatible with the cathode environment; generally ambient air, and/or battery catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. As such, the properties of different ionic conductors are combined in a protective membrane architecture that has the desired properties of high overall ionic conductivity and chemical stability towards the anode, the cathode environment and ambient conditions encountered in battery manufacturing. The protective membrane architecture is capable of protecting an active metal anode from deleterious reaction with other battery components or ambient conditions while providing a high level of ionic conductivity to facilitate manufacture and/or enhance performance of a battery cell in which the composite is incorporated.

Referring to FIG. 3B, a protected anode embodiment having a partially solid state protective membrane architecture is illustrated and described. In this embodiment, the inventive composite solid electrolyte of the instant invention can be, or form part of, the substantially impervious component of the ionically conductive protective membrane architecture, such as are described in U.S. patent application Ser. No. 10/824,944, filed Apr. 14, 2004, incorporated by reference herein in its entirety and for all purposes, which also includes an active metal ion conducting separator compatible with active metal (e.g., lithium) containing a non-aqueous anolyte, e.g., liquid, solid polymer, or gel electrolyte. Thus, the composite solid electrolyte of the instant invention finds use in the applications described therein.

Specifically, FIG. 3B shows an unscaled depiction of a protected anode 310 having an active metal, active metal-ion, active metal alloying metal, or active metal intercalating material anode 312 and an ionically conductive protective membrane architecture 314. The protective architecture 314 has an active metal ion conducting separator layer 316 with a non-aqueous anolyte on a surface of the anode 312 and a substantially impervious ionically conductive layer of an active metal ion conducting composite solid electrolyte of the instant invention 318 in contact with the separator layer 316. The separator layer 316 is chemically compatible with the active metal and the substantially impervious layer (inventive composite) 318 is chemically compatible with the separator layer 316 and aqueous environments. The protected anode 310 may optionally include a current collector 311, composed of a suitable conductive metal that does not alloy with or intercalate the active metal. When the active metal is lithium, a suitable current collector material is copper. The current collector 310 can also serve to seal the anode from ambient to prevent deleterious reaction of the active metal with ambient air or moisture.

The separator layer 316 is composed of a semi-permeable membrane impregnated with an organic anolyte. For example, the semi-permeable membrane may be a microporous polymer, such as are available from Celgard, Inc. The organic anolyte may be in the liquid or gel phase. For example, the anolyte may include a solvent selected from the group consisting of organic carbonates, ethers, lactones, sulfones, etc, and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure, as described further below. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will also, of course, also include active metal salts, such as, in the case of lithium, for example, $LiPF_6$, $LiBF_4$, $LiAsF_6$, $LiSO_3CF_3$ or $LiN(SO_2C_2F_5)_2$. One example of a suitable separator layer is 1 M $LiPF_6$ dissolved in propylene carbonate and impregnated in a Celgard microporous polymer membrane.

The non-aqueous electrolyte interlayer of the protective membrane architecture of the present invention isolates the lithium (for example) electrode from reacting with the active metal ion conducting inventive composite solid electrolyte of the instant invention. The important criteria are that the lithium electrode is stable in the non-aqueous anolyte, the non-aqueous anolyte is sufficiently conductive to $Li^+$ ions, the lithium electrode does not directly contact the active metal ion conducting inventive composite solid electrolyte, and the entire assembly allows lithium ions to pass through with high conductivity.

There are a number of advantages of a protective membrane architecture in accordance with this aspect of the present invention. In particular, cell structures incorporating such an architecture may be relatively easily manufactured. In one example, lithium metal is simply placed against a microporous separator impregnated with organic liquid or gel electrolyte and with the separator adjacent to a composite solid electrolyte of the instant invention.

Referring to FIG. 3C an alternative solid state structure for protective membrane architectures in accordance with the present invention are shown. In these embodiments, the inventive composite solid electrolyte can be, or form part of, the substantially impervious (second) component in a laminate or graded composite ionically conductive protective layer of the sort described in described in commonly assigned U.S. patent application Ser. No. 10/772,157, filed Feb. 3, 2004; Ser. No. 10/825,587, filed Apr. 14, 2004; and Ser. No. 10/772,228, filed Feb. 3, 2004; incorporated by reference herein in their entirety and for all purposes, which also includes a second active metal ion conducting solid material compatible with active metal (e.g., lithium). Thus, again, the composite solid electrolyte of the instant invention finds use in the applications described therein as well.

Generally, the solid state protective membrane architectures (described with reference to FIG. 3C) are a laminate composed of at least two layers having different chemical compatibility requirements, one chemically compatible with the anode and the other chemically compatible with the cathode environment; generally ambient air, and/or battery cathoytes. Referring to the protected anode embodiment and its corresponding protective membrane architecture depicted in FIG. 3C the protective membrane architecture is laminate having a first and second material layer. The first material layer (or first layer material) of the architecture is ionically conductive, and chemically compatible with an alkali metal anode. Chemical compatibility in this aspect of the invention refers both to a material that is chemically stable and therefore substantially unreactive when contacted with an alkali metal anode. It may also refer to a material that is chemically stable with air, to facilitate storage and handling, and reactive when contacted with an alkali metal anode to produce a product that is chemically stable against the alkali metal anode and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

FIG. 3C illustrates a protected anode structure incorporating protective membrane architecture in accordance with this solid state aspect of the present invention. The protected anode 320 includes an active metal electrode 322, e.g., lithium, bonded with a current collector 321, e.g., copper, and a protective membrane architecture 324. The protective membrane architecture 324 is composed of a first layer 326 of a material that is both ionically conductive and chemically compatible with an active metal electrode material, but not chemically compatible with electrolyte or oxidizing materials (e.g., air). For example, the first layer, in contact with the active metal, may be composed, in whole or in part, of active metal nitrides, active metal phosphides or active metal halides. Specific examples include $Li_3N$, $Li_3P$, $LiI$, $LiBr$, $LiCl$, $LiF$ and LiPON. The thickness of the first material layer is preferably about 0.1 to 5 microns, or 0.2 to 1 micron, for example about 0.25 micron.

Active metal electrode materials (e.g., lithium) may be applied to these materials, or they may be formed in situ by contacting precursors such as metal nitrides, metal phosphides, metal halides, red phosphorus, iodine and the like with lithium. The in situ formation of the first layer may be by way of conversion of the precursors to a lithiated analog, for example, according to reactions of the following type (using P, $Cu_3N$, and $PbI_2$ precursors as examples):

1. $3Li+P=Li_3P$ (reaction of the precursor to form Li-ion conductor);
2(a). $3Li+Cu_3N=Li_3N+3Cu$ (reaction to form Li-ion conductor/metal composite);
2(b). $2Li+PbI_2=2 LiI+Pb$ (reaction to form Li-ion conductor/metal composite).

First layer materials, which may include electronically conductive metal particles, formed as a result of in situ conversions meet the requirements of a first layer material for a protective composite in accordance with the present invention and are therefore within the scope of the invention.

Furthermore, a particularly suitable precursor material is $Cu_3N$. The in situ formation of the first layer may result from an incomplete conversion of the precursors to their lithiated analog. Nevertheless, such incomplete conversions meet the requirements of a first layer material for a protective composite in accordance with the present invention and are therefore within the scope of the invention. In this regard, the composite conversion product of $Cu_3N$ with Li is one particularly preferred embodiment of a first layer material in accordance with this aspect of the invention.

The second layer 328 of the laminate protective membrane architecture is composed of the substantially impervious active metal ion conducting composite solid electrolyte of the instant invention as described above.

When the anode structure is incorporated in a battery cell with a water or air (or other active metal corrosive material) cathode, the first layer 326 is adjacent to an active metal (e.g., lithium) anode and the second layer 328 is adjacent to cathode material and its associated aqueous (or other active metal corrosive) electrolyte. As further described below, such battery cells also generally include a porous catalytic electronically conductive support structure to facilitate the cathodic reaction in the cell.

In addition to the solid state protective membrane architecture described above, a protective membrane architecture in accordance with the present invention may alternatively be compositionally and functionally graded. Through the use of appropriate deposition technology such as RF sputter deposition, electron beam deposition, thermal spray deposition, and or plasma spray deposition, it is possible to use multiple sources to lay down a graded film. In this way, the discrete interface between layers of distinct composition and functional character is replaced by a gradual transition of from one layer to the other. The result, as with the discrete layer laminates described above, is a bi-functionally compatible ionically conductive protective membrane architecture stable on one side to lithium or other active metal (first material), and on the other side substantially impervious and stable to the cathode, other battery cell components and preferably to ambient atmosphere (second material).

The solid state aspect of the invention may also be embodied as separators independent from anode active materials. These separators having an ionically conductive first material or precursor that is chemically compatible with an active metal and air; and a second material in contact with the first material, the second material comprising a glassy, ceramic or glass-ceramic solid electrolyte material based on the inventive composite solid electrolyte and being substantially impervious, ionically conductive and chemically compatible with the first material and active metal corrosive environments. They may be laminate or graded in form, as described above.

A suitable active metal compatible layer (first layer) may also include a polymer component to enhance its properties. For example, polymer-iodine complexes like poly(2-vinylpyridine)-iodine (P2VP-$I_2$), polyethylene-iodine, or tetraalkylammonium-iodine complexes can react with Li to form a LiI-based film having significantly higher ionic conductivity than that for pure LiI.

Also, a suitable first layer may include a material used to facilitate its use, for example, the residue of a thin wetting layer (e.g., Ag) used to prevent reaction between vapor phase lithium (during deposition) and LiPON when LiPON is used as a first layer material. When lithium is evaporated onto this structure, the Ag is converted to Ag—Li and diffuses, at least in part, into the greater mass of deposited lithium, and a protected lithium electrode is created. The thin Ag coating prevents the hot (vapor phase) lithium from contacting and adversely reaction with the LiPON first material layer. After deposition, the solid phase lithium is stable against the LiPON. A multitude of such transient/wetting (e.g., Sn) and first layer material combinations can be used to achieve the desired result.

When the first material layer is a precursor material chemically stable in air, for example $Cu_3N$ or LiPON, the protective composite battery separator may be handled or stored in normal ambient atmospheric conditions without degradation prior to incorporation into a battery cell. When the separator is incorporated into a battery cell, the precursor layer is contacted with an active metal (e.g., lithium) electrode. The precursor reacts with the active metal to form an ionically conductive material that is chemically compatible with the active metal electrode material. The second layer is contacted with an electrolyte to which a cathode and current collector is or has been applied. Alternatively, the second layer acts as the sole electrolyte in the battery cell. In either case, the combination of the two layers in the protective composite protects the active metal electrode and the electrolyte and/or cathode from deleterious reaction with one another.

The layers may be formed using a variety of techniques. These include deposition or evaporation (including e-beam evaporation) or thermal spray techniques such as plasma spray of layers of material, such as $Li_3N$ or an ionically conductive glass (e.g., LiPON). Also, as noted above, the active metal electrode adjacent layer may be formed in situ from the non-deleterious reaction of one or more precursors with the active metal electrode. For example, a $Li_3N$ layer may be formed on a Li anode by contacting $Cu_3N$ with the Li anode surface, or $Li_3P$ may be formed on a Li anode by contacting red phosphorus with the Li anode surface.

Compositions, components and methods of fabrication for or adaptable to the compositions, structures, devices and methods of the present invention are described in U.S. patent application Ser. No. 10/686,189, filed Oct. 14, 2003, and titled IONICALLY CONDUCTIVE COMPOSITES FOR PROTECTION OF ACTIVE METAL ANODES, and U.S. patent application Ser. No. 10/731,771, filed Dec. 5, 2003, and titled IONICALLY CONDUCTIVE COMPOSITES FOR PROTECTION OF ACTIVE METAL ANODES. These applications are incorporated by reference herein in their entirety for all purposes.

Fabrication Techniques

Protected anodes and protective membrane architectures in accordance with the present invention may be formed using a variety of methods. These include deposition or evaporation (including e-beam evaporation) of the interlayer or interlayer precursor material on the inventive composite solid electrolyte. Also, as noted above and described further below, the interlayer may be formed in situ from the non-deleterious reaction of one or more precursors materials with an active metal electrode or material, by deposition or evaporation of lithium on the precursor, by direct contact of the precursor with a lithium metal (e.g., foil), or by plating of the precursor with lithium through the composite solid electrolyte layer.

Figure 4:
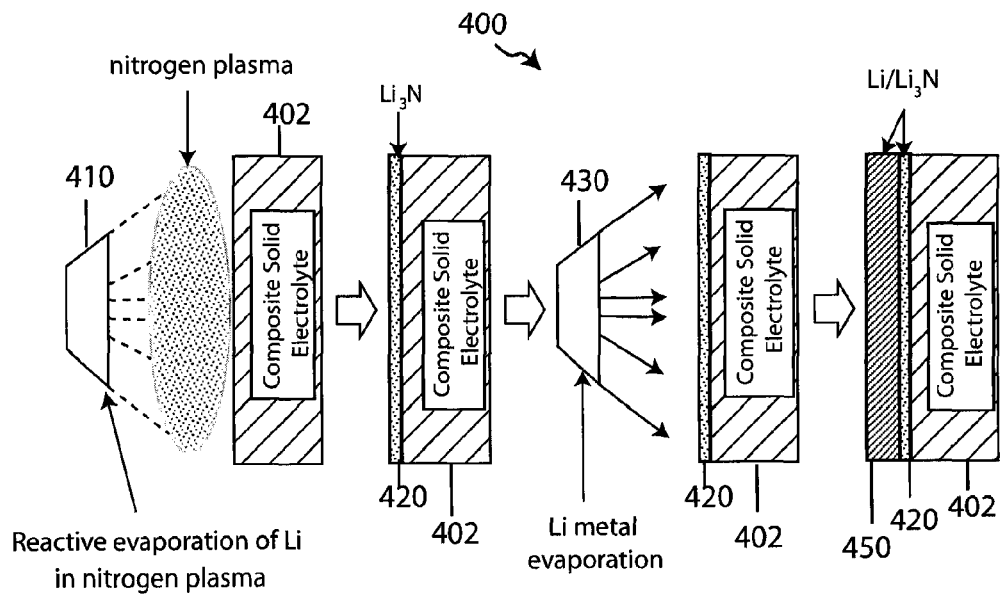
FIGS. 4 and 5 are schematic illustrations of alternative methods of making a protected anode incorporating a protective membrane architecture comprising a composite solid electrolyte in accordance with the present invention.

Referring to FIG. 4, a first method 400 for forming a protected anode having fully solid-state protective membrane architecture in accordance with the present invention is shown. An interlayer material 420, that is a highly ionically conductive and active metal chemically compatible, is directly deposited onto the substantially impervious, ionically conductive composite solid electrolyte 402 of the instant invention. This can be done by a variety of techniques 410 including RF sputtering, e-beam evaporation, thermal evaporation, or reactive thermal or e-beam evaporation, for example. In the particular example illustrated in the figure, lithium is evaporated 410 in a nitrogen plasma to form a lithium nitride ($Li_3N$) 420 interlayer on the surface of the composite solid electrolyte 402 as described above. This is followed by evaporation of lithium metal 430 onto the $Li_3N$ film 420. The $Li_3N$ interlayer separates the lithium metal electrode from the composite solid electrolyte, but allows Li ions to pass from the Li electrode 450 through the composite. Of course, other active metal, and interlayer materials, as described herein, may be used as well.

Figure 5:
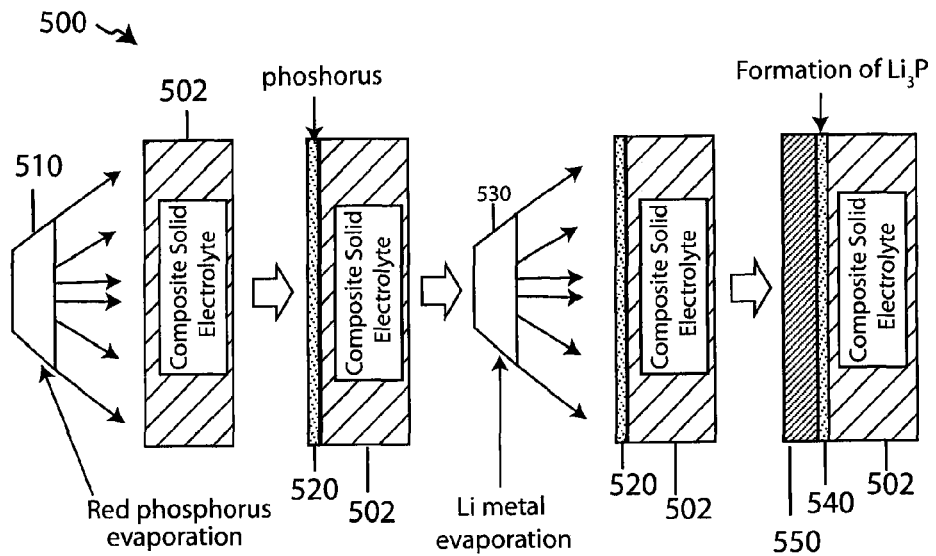

Alternatively, referring to FIG. 5, a second method 500 for forming a protected anode having fully solid-state protective membrane architecture in accordance with the present invention is shown. The ionically conductive active metal anode compatible interlayer material 540 is formed in situ following formation of a precursor layer 520 on the inventive composite solid electrolyte 502. In the particular example illustrated in the figure, a surface of the composite solid electrolyte 502 is coated 510 with red phosphorus 520, a precursor for an active metal (in this case lithium) phosphide interlayer. Then a layer of lithium metal 550 is deposited onto the phosphorus. The reaction of lithium and phosphorus forms $Li_3P$ 540 according to the following reaction: $3Li+P=Li_3P$. $Li_3P$ is an ionically conductive material that is chemically compatible with both the lithium anode and the composite solid electrolyte. In this way, the composite solid electrolyte is not in direct contact with the lithium electrode. Of course, other active metal, interlayer precursor materials, as described herein, may be used as well. Alternative precursor examples include $CuN_3$, which may be formed as a thin layer on the composite solid electrolyte and contacted with a Li anode in a similar manner according to the following reaction: $3Li+CuN_3=Li_3N+3Cu$; or lead iodide which may be formed as a thin layer on a polymer electrolyte and contacted with a Li anode in a similar manner according to the following reaction: $2Li+PbI_2=2LiI+Pb$.

In either of the forgoing methods, rather than forming a lithium (or other active metal) layer on the interlayer material or precursor, the interlayer or precursor material may be contacted with lithium by bonding metallic lithium to the interlayer material or precursor, for example by direct contact with extruded lithium metal foil.

Also as noted above, in an alternative embodiment of the invention the interlayer may include additional material components. For instance, a suitable interlayer may include a polymer component to enhance its properties. For example, polymer-iodine complexes like poly(2-vinylpyridine)-iodine (P2VP-$I_2$), polyethylene-iodine, or tetraalkylammonium-iodine can react with Li to form an ionically conductive LiI-based film that is chemically compatible with both an active metal and a composite solid electrolyte layer as described herein. Without intending to be bound by theory, it is expected that the use of polymer-iodine charge transfer complexes can lead to formation of composites containing LiI and polymer and having significantly higher ionic conductivity than that for pure LiI. Other halogens may also be used in this manner, for example in bromine complexes.

In a first embodiment of this aspect of the present invention a polymer layer and a layer of iodine are coated on the surface of the composite solid electrolyte and allowed to react forming a polymer-iodine complex.

According to this method, a thin layer of polymer may be applied to the composite solid electrolyte using brushing, dipping, or spraying. For example, the composite may be coated with a thin (e.g, 0.5 to 2.0 micron, preferably 0.1 to 0.5 micron) layer of P2VP in this way.

One technique for applying an iodine coating is sublimation of crystalline iodine that can be achieved at room temperature (e.g., about 20 to 25° C.) in a reactor placed in the dry box or in a dry room. A sublimed layer of iodine can be made very thin (e.g., 0.05 to 1.0 microns and the rate of sublimation can be adjusted by varying the temperature or distance between the substrate and source of iodine.

Alternatively, high concentrations (e.g., 50 to 100 g/liter of iodine can be dissolved in an organic solvent, such as acetonitrile and n-heptane. Dissolved iodine can be coated on a composite solid electrolyte surface by such methods as dip coating, spraying or brushing, among others. In this case, treatment conditions can be easily changed by varying the length of coating treatment and iodine concentrations. Examples of iodine sources for this technique include metal iodides are AgI and $PbI_2$, which are known to be used as the cathode materials in solid-state batteries with Li anode and LH-based solid electrolyte.

Then, lithium (or other active metal) is contacted with the polymer-iodine complex on the conductive glass (or other second layer material), for example by evaporation or pressing onto the composite solid electrolyte layer with this complex. The result is a LH-containing protective membrane architecture on the Li anode.

In an alternative embodiment of this aspect of the present invention the composite solid electrolyte surface is coated with a thin layer of iodine, such as by a technique described above that can react with Li forming LiI layer.

Active metal, for example lithium foil, can be coated with a thin layer of polymer, for example as described above, and then contacted with the iodine layer on the glass. After assembly, iodine reacts with the polymer layer and, as a result, LiI-containing composite protective barrier layer with reduced impedance is formed.

The protective membrane architectures described herein prevent the active metal from deleterious reaction with the environment on the other (cathode) side of the substantially impervious composite solid electrolyte, which may include aqueous, air or organic liquid electrolytes (catholytes) and/or electrochemically active materials.

The invention also includes a variety of battery and other electrochemical cells incorporating the inventive protective architectures. Examples of such cells are generally described below:

Battery Cells

Figure 6:
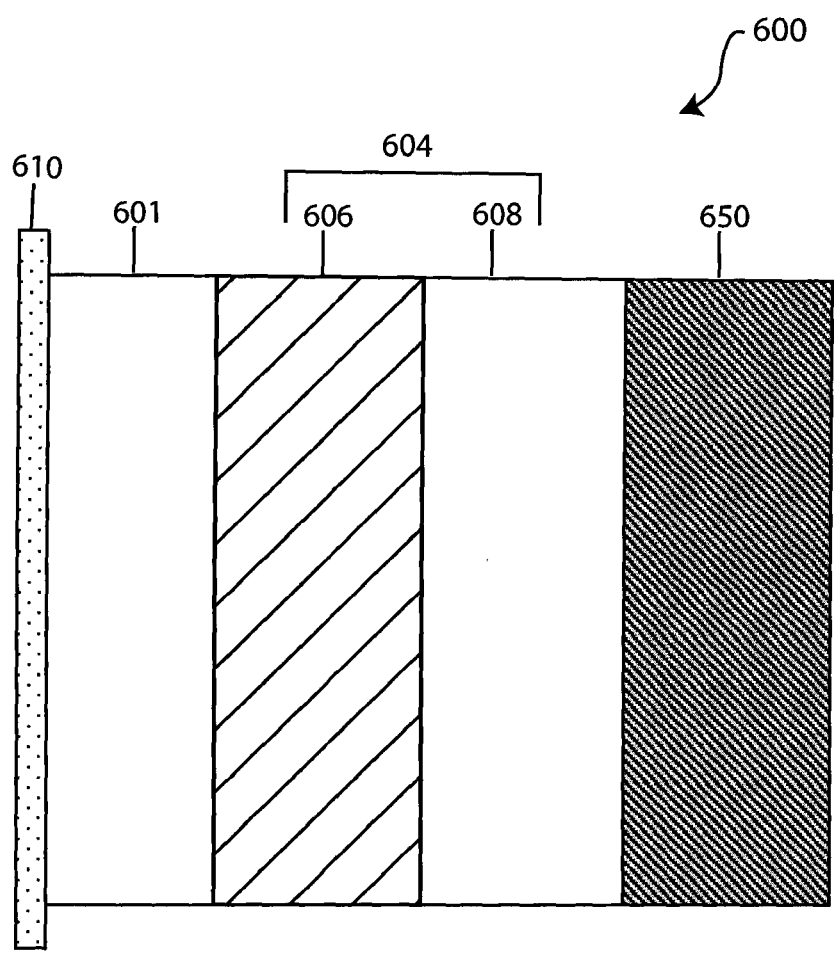
FIG. 6 illustrates a cross sectional depiction of a battery cell incorporating a protected anode comprising a composite solid electrolyte as a substantially impervious component of the protective membrane architecture in accordance with the present invention.

The protected anodes and their corresponding protective membrane architectures can be usefully adopted in battery cells. For example, the protected anodes as described herein and in reference to FIGS. 2 and 3A-C can be paired with a cathode system 650 to form a cell 600, as depicted in FIG. 6. The cell 600, includes a current collector 610, and active metal (e.g., lithium) anode 601, a protective membrane architecture 604, comprising the inventive composite solid electrolyte 608 that is compatible with active metal corrosive environments. In one embodiment, the protective membrane architecture comprising the composite solid electrolyte of the instant invention is in contact with both the anode and the cathode environment of the cathode system. More commonly, as depicted in FIG. 6 the composite solid electrolyte 608 is separated from the anode by a material layer 606 (also referred to as the first material layer) that is chemically compatible with the active metal, as described in detail above in various alternatives. With respect to solid state protective membrane architectures the material layer 606, is a also referred to as a first material layer and is a solid phase ionically conductive layer chemically compatible with the anode, as described above. With respect to a partially solid state protective membrane architecture, the material layer is an interlayer comprising non-aqueous anolyte, also described above.

The cathode system 650 includes an electronically conductive component, an ionically conductive component, and an electrochemically active component. The cathode system 650 may have any desired composition and, due to the isolation provided by the protective membrane architecture, is not limited by the anode or, in partially solid state implementations, the anolyte composition. In particular, the cathode system may incorporate components which would otherwise be highly reactive with the anode active metal, such as aqueous materials, including water, aqueous catholytes and air, metal hydride electrodes and metal oxide electrodes.

The cells may be primary or secondary cells.

Cathode Systems

As noted above, the cathode system 650 of a battery cell in accordance with the present invention may have any desired composition and, due to the isolation provided by the protective membrane architecture, is not limited by the anode or, in partially solid state implementations, the anolyte composition. In particular, the cathode system may incorporate components which would otherwise be highly reactive with the anode active metal, such as aqueous materials, including water, aqueous solutions and air, metal hydride electrodes and metal oxide electrodes.

Battery cells of the present invention may include, without limitation, water, aqueous and non-aqueous cathodes or catholyte solutions, air electrodes and metal hydride electrodes, such as are described in co-pending application Ser. Nos. 10/772,157, 10/824,944 and 11/662,883. All of these applications are incorporated herein by reference in their entirety and for all purposes. Battery cells of the instant invention also include metal oxide electrodes, as used, for example, in conventional Li-ion cells (e.g., $Li_xCoO_2$, $Li_xNiO_2$, $Li_xMn_2O_4$, $LiFePO_4$, $Ag_xV_2O_5$, $Cu_xV_2O_5$, $V_2O_5$, $V_6O_{13}$, $FeS_2$, $TiS_2$, $MnO_2$, $CuO$, $Ag_2CrO_4$, $MoO_3$, $CuS$ and $FeS$). Active sulfur cathodes (e.g., elemental sulfur or polysulfides) may be used. In some embodiments, a cathode is selected to provide a cell voltage of from about 2 to 5 Volts.

The effective isolation between anode and cathode achieved by the protective membrane architecture of the present invention also enables a great degree of flexibility in the choice of catholyte systems, in particular aqueous systems, but also non-aqueous systems. Since the protected anode is completely decoupled from the catholyte, so that catholyte compatibility with the anode is no longer an issue, solvents and salts which are not kinetically stable to Li can be used.

Active Metal/Water Cells and Active Metal/Aqueous Cells

For cells using water as an electrochemically active cathode material, a porous electronically conductive support structure can provide the electronically conductive component of the cathode system. An aqueous electrolyte (catholyte) provides ion carriers for transport (conductivity) of Li ions and anions that combine with Li. The electrochemically active component (water) and the ionically conductive component (aqueous catholyte) will be intermixed as a single solution, although they are conceptually separate elements of the battery cell. Suitable catholytes for the Li/water battery cell of the invention include any aqueous electrolyte with suitable ionic conductivity. Suitable electrolytes may be acidic, for example, strong acids like HCl, $H_2SO_4$, $H_3PO_4$ or weak acids like acetic acid/Li acetate; basic, for example, LiOH; neutral, for example, sea water, LiCl, LiBr, LiI; or amphoteric, for example, $NH_4Cl$, $NH_4Br$, etc.

The suitability of sea water as an electrolyte enables a battery cell for marine applications with very high energy density. Prior to use, the cell structure is composed of the protected anode and a porous electronically conductive support structure (electronically conductive component of the cathode). When needed, the cell is completed by immersing it in sea water which provides the electrochemically active and ionically conductive components. Since the latter components are provided by the sea water in the environment, they need not transported as part of the battery cell prior to it use (and thus need not be included in the cell's energy density calculation). Such a cell is referred to as an "open" cell since the reaction products on the cathode side are not contained. Such a cell is, therefore, a primary cell.

Secondary Li/water cells are also possible in accordance with the invention. As noted above, such cells are referred to as "closed" cells since the reaction products on the cathode side are contained on the cathode side of the cell to be available to recharge the anode by moving the Li ions back across the protective membrane when the appropriate recharging potential is applied to the cell.

As noted above and described further below, in another embodiment of the invention, ionomers coated on the porous catalytic electronically conductive support reduce or eliminate the need for ionic conductivity in the electrochemically active material.

The electrochemical reaction that occurs in a Li/water cell is a redox reaction in which the electrochemically active cathode material gets reduced. In a Li/water cell, the catalytic electronically conductive support facilitates the redox reaction. As noted above, while not so limited, in a Li/water cell, the cell reaction is believed to be:

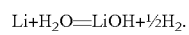

The half-cell reactions at the anode and cathode are believed to be:

Accordingly, the catalyst for the Li/water cathode promotes electron transfer to water, generating hydrogen and hydroxide ion. A common, inexpensive catalyst for this reaction is nickel metal; precious metals like Pt, Pd, Ru, Au, etc. will also work but are more expensive.

Also considered to be within the scope of Li (or other active metal)/water batteries of this invention are batteries with a protected Li anode and an aqueous electrolyte composed of gaseous and/or solid oxidants soluble in water that can be used as active cathode materials (electrochemically active component). Use of water soluble compounds, which are stronger oxidizers than water, can significantly increase battery energy in some applications compared to the lithium/water battery, where during the cell discharge reaction, electrochemical hydrogen evolution takes place at the cathode surface. Examples of such gaseous oxidants are $O_2$, $SO_2$ and $NO_2$. Also, metal nitrites, in particular $NaNO_2$ and $KNO_2$ and metal sulfites such as $Na_2SO_3$ and $K_2SO_3$ are stronger oxidants than water and can be easily dissolved in large concentrations. Another class of inorganic oxidants soluble in water are peroxides of lithium, sodium and potassium, as well as hydrogen peroxide $H_2O_2$.

The use of hydrogen peroxide as an oxidant can be especially beneficial. There are at least two ways of utilizing hydrogen peroxide in a battery cell in accordance with the present invention. First of all, chemical decomposition of hydrogen peroxide on the cathode surface leads to production of oxygen gas, which can be used as active cathode material. The second, perhaps more effective way, is based on the direct electroreduction of hydrogen peroxide on the cathode surface. In principal, hydrogen peroxide can be reduced from either basic or acidic solutions. The highest energy density can be achieved for a battery utilizing hydrogen peroxide reduction from acidic solutions. In this case a cell with Li anode yields $E^0=4.82$ V (for standard conditions) compared to $E^0=3.05$ V for Li/Water couple. However, because of very high reactivity of both acids and hydrogen peroxide to unprotected Li, such cell can be practically realized only for protected Li anode such as in accordance with the present invention.

Active Metal/Air Battery Cells

Active metal/air battery cells are another class of active metal/aqueous cells in accordance with the present invention. These cells have an active metal, e.g., alkali metal, e.g., lithium (Li), anode with a protective membrane and a cathode structure with air as the electrochemically active component.

While not so limited, the electrochemical reaction between the Li ions from the anode and the air is believed to be described by one or more of the following reaction schemes:

$$Li + \tfrac{1}{2}H_2O + \tfrac{1}{4}O_2 = LiOH$$

$$Li + \tfrac{1}{4}O_2 = \tfrac{1}{2}Li_2O$$

$$Li\tfrac{1}{2}O = \tfrac{1}{2}Li_2O_2$$

Thus both moisture ($H_2O$) and oxygen in the air are participants in the electrochemical reaction.

Since metal/air batteries obtain the cathode active reactant from the ambient environment, the volumetric and gravimetric energy densities are very high. The high energy density of metal/air batteries makes them attractive for a wide variety of applications where weight and size are a premium. Unfortunately, conventional metal/air batteries suffer from parasitic reactions in which the metal electrode corrodes to generate hydrogen. The anode corrosion reaction can be minimized by incorporating KOH in the electrolyte. However, this introduces another problem as $CO_2$ from the air is converted to $K_2CO_3$ in the air electrode, thereby forming precipitates that cause premature failure of the cell. Such problems are eliminated by the subject invention in that the active metal electrode is isolated from the aqueous electrolyte, preventing corrosion of the anode. Since the anode does not corrode in the electrolyte solution, and is in fact de-coupled from it, the air electrode can be formulated with neutral (LiCl), basic (KOH), or acidic ($NH_4Cl$, HCl, etc.) electrolyte. While not so limited, for the case of acidic electrolyte, shown below, the cell reaction is believed to proceed by forming lithium chloride. In such a cell, the air electrode does not scavenge $CO_2$ from the air, and there is no $K_2CO_3$ formation.

$$Li + \tfrac{1}{2}O2 + NH_4Cl = LiCl + NH_3$$

The subject invention allows the use of neutral or acidic electrolytes in active metal/air batteries due to the fact that the aqueous electrolyte is not in contact with the metal anode, and thereby cannot corrode the metal anode.

The Li/air cells of the present invention may be either primary or secondary cells.

For cells using air as an electrochemically active cathode material, the air electrochemically active component of these cells includes moisture to provide water for the electrochemical reaction. The cells have an electronically conductive support structure electrically connected with the anode to allow electron transfer to reduce the air cathode active material. The electronically conductive support structure is generally porous to allow fluid (air) flow and either catalytic or treated with a catalyst to catalyze the reduction of the cathode active material. An aqueous electrolyte with suitable ionic conductivity or ionomer is also in contact with the electronically conductive support structure to allow ion transport within the electronically conductive support structure to complete the redox reaction.

The air cathode system includes an electronically conductive component (for example, a porous electronic conductor), an ionically conductive component with at least an aqueous constituent, and air as an electrochemically active component. It may be any suitable air electrode, including those conventionally used in metal (e.g., Zn)/air batteries or low temperature (e.g., PEM) fuel cells. Air cathodes used in metal/air batteries, in particular in Zn/air batteries, are described in many sources including "Handbook of Batteries" (Linden and T. B. Reddy, McGraw-Hill, NY, Third Edition) and are usually composed of several layers including an air diffusion membrane, a hydrophobic Teflon layer, a catalyst layer, and a metal electronically conductive component/current collector, such as a Ni screen. The catalyst layer also includes an ionically conductive component/electrolyte that may be aqueous and/or ionomeric. A typical aqueous electrolyte is composed of KOH dissolved in water. An typical ionomeric electrolyte is composed of a hydrated (water) Li ion conductive polymer such as a per-fluoro-sulfonic acid polymer film (e.g., du Pont NAFION). The air diffusion membrane adjusts the air (oxygen) flow. The hydrophobic layer prevents penetration of the cell's electrolyte into the air-diffusion membrane. This layer usually contains carbon and Teflon particles. The catalyst layer usually contains a high surface area carbon and a catalyst for acceleration of reduction of oxygen gas. Metal oxides, for example $MnO_2$, are used as the catalysts for oxygen reduction in most of the commercial cathodes. Alternative catalysts include metal macrocycles such as cobalt phthalocyanine, and highly dispersed precious metals such at platinum and platinum/ruthenium alloys. Since the air electrode structure is chemically isolated from the active metal electrode, the chemical composition of the air electrode is not constrained by potential reactivity with the anode active material. This can allow for the design of higher performance air electrodes using materials that would normally attack unprotected metal electrodes.

In an alternative embodiment, the active metal/air battery cell can be non-aqueous in that the ionically conductive component is a non-aqueous catholyte comprising at least one non-aqueous solvent, and non-aqueous solvents represent more than 50% of the catholyte's solvent volume. Non-aqueous active metal/air battery cells are described in U.S. application Ser. No. 11/562,883 copending and commonly assigned, and hereby incorporated by reference for all that it contains. In this embodiment, the electrochemically active component is $O_2$, which in one embodiment is obtained from the ambient air. A suitable air cathode system includes air electrodes and air cathodes as described above for aqueous active metal/air cells. In this embodiment, both non-aqueous protic and aprotic solvents as well as non-aqueous donor and acceptor solvents are suitable for use in the non-aqueous catholyte.

Suitable non-aqueous protic solvents include alcohols (ethanol, methanol, propanol, butanol, methoxyethanol), diols (e.g., ethylene glycol, ethanediol, propanediol) and liquid polyols containing multiple hydroxyl groups. Preferred protic solvents are diols, particularly EG.

Suitable aprotic solvents include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N' tetraethylsulfamide, tetramethylurea (TMU), 2-pyrrolidone, N-methylpyrrolidone, N-methylpyrrolidinone), amines (e.g., butylamine, ethylenediamine, triethylamine, pyridine, 1,1,3,3-tetramethylguanidine (TMG), tetraethylenediamine, tetramethylpropylenediamine, pentamethyldiethylenetriamine, organosulfur solvents (e.g., dimethylsulfoxide (DMSO), sulfolane, other sulfones, dimethylsulfite, ethylene sulfite, organophosphorous solvent (e.g., tributylphosphate, trimethylphosphate, hexamethylphosphoramide (HMPA)).

Active Metal/Metal Hydride Battery Cell

Another type of active metal/aqueous battery cell incorporating a protected anode and a cathode system with an aqueous component in accordance with the present invention is a lithium (or other active metal)/metal hydride battery. For example, lithium anodes protected with a non-aqueous interlayer architecture as described herein can be discharged and charged in aqueous solutions suitable as electrolytes in a lithium/metal hydride battery. Suitable electrolytes provide a source or protons. Examples include aqueous solutions of halide acids or acidic salts, including chloride or bromide acids or salts, for example HCl, HBr, $NH_4Cl$ or $NH_4Br$.

During discharge, lithium ions from the anode pass through the ionically conductive protective membrane into the aqueous electrolyte, and protons are reduced to hydride ions that are incorporated into the metal alloy positive electrode (cathode). Thus, the cathode side of the cell has a cathode structure an electronically conductive component (metal alloy), an ionically conductive component (aqueous electrolyte), and an electrochemically active component (protons/metal alloy). This is analogous to known metal hydride chemistry used in nickel/metal hydride (Ni/MH) batteries. However, in this case the acid in the electrolyte is consumed and converted to lithium salt. The cells may be primary, but are generally secondary (rechargeable) due to materials costs. On recharge of secondary cells, lithium ions are transported through the protective membrane to the lithium electrode and reduced to Li metal, while the metal hydride is oxidized to release protons and regenerate the acid electrolyte. Such a cell exhibits excellent cycle life due to the highly reversible nature of the positive and negative electrodes.

While not so limited, the half and full cell reactions for a lithium/metal hydride cell in accordance with the present invention are believed to be as follows:

Anode:Li=Li$^+$+e$^-$

Cathode:HCl+M+e$^-$=MH+Cl$^-$

Cell Reaction:Li+HCl+M=LiCl+MH

Metal hydride alloys are well known to those skilled in the art, and are generally chosen from rare earth based alloys (Misch metal) designated as $AB_5$ ($LaNi_5$ and $LaCo_5$ with partial substitutions to improve performance) and $AB_2$ alloys consisting of titanium and zirconium (such as $ZrNi_2$). The metal hydride electrode is typically engineered as a highly porous structure having a perforated nickel foil or grid onto which a polymer-bonded active hydrogen storage alloy is coated. The metal hydride electrode is used commercially in the nickel/metal hydride (Ni/MH) battery. In this chemistry, an alkaline electrolyte is used, and the hydride alloys are modified to perform well in alkaline conditions. For the case of a Li/MH battery, the electrolyte will be acidic, and so the composition of the $AB_5$ or $AB_2$ alloy may be modified to cycle well in acidic electrolytes.

In addition to the aqueous, air, etc., systems noted above, improved performance can be obtained with cathode systems incorporating conventional Li-ion battery cathodes and electrolytes, such as metal oxide cathodes (e.g., $Li_xCoO_2$, $Li_x$-$NiO_2$, $Li_xMn_2O_4$ and $LiFePO_4$) and the binary, ternary or multicomponent mixtures of alkyl carbonates or their mixtures with ethers as solvents for a Li metal salt (e.g., $LiPF_6$, $LiAsF_6$ or $LiBF_4$); or Li metal battery cathodes (e.g., elemental sulfur or polysulfides) and electrolytes composed of organic carbonates, ethers, glymes, lactones, sulfones, sulfolane, and combinations thereof, such as EC, PC, DEC, DMC, EMC, 1,2-DME, THF, 2MeTHF, and combinations thereof, as described, for example, in U.S. Pat. No. 6,376,123, incorporated herein by reference.

Moreover, the catholyte solution can be composed of only low viscosity solvents, such as ethers like 1,2-dimethoxy ethane (DME), tetrahydrofuran (THF), 2-methyltetrahydrofuran, 1,3-dioxolane (DIOX), 4-methyldioxolane (4-Me-DIOX) or organic carbonates like dimethylcarbonate (DMC), ethylmethylcarbonate (EMC), diethylcarbonate (DEC), or their mixtures. Also, super low viscosity ester solvents or co-solvents such as methyl formate and methyl acetate, which are very reactive to unprotected Li, can be used. As is known to those skilled in the art, ionic conductivity and diffusion rates are inversely proportional to viscosity such that all other things being equal, battery performance improves as the viscosity of the solvent decreases. The use of such catholyte solvent systems significantly improves battery performance, in particular discharge and charge characteristics at low temperatures.

Ionic liquids may also be used in catholytes of the present invention. Ionic liquids are organic salts with melting points under 100 degrees, often even lower than room temperature. The most common ionic liquids are imidazolium and pyridinium derivatives, but also phosphonium or tetralkylammonium compounds are also known. Ionic liquids have the desirable attributes of high ionic conductivity, high thermal stability, no measurable vapor pressure, and non-flammability. Representative ionic liquids are 1-Ethyl-3-methylimidazolium tosylate (EMIM-Ts), 1-Butyl-3-methylimidazolium octyl sulfate (BMIM-OctSO4), 1-Ethyl-3-methylimidazolium hexafluorophosphate, and 1-Hexyl-3-methylimidazolium tetrafluoroborate. Although there has been substantial interest in ionic liquids for electrochemical applications such as capacitors and batteries, they are unstable to metallic lithium and lithiated carbon. However, protected lithium anodes as described in this invention are isolated from direct chemical reaction, and consequently lithium metal batteries using ionic liquids are possible as an embodiment of the present invention. Such batteries should be particularly stable at elevated temperatures.

Safety Additives

As a safety measure, the non-aqueous interlayer architecture embodiment of the present invention can incorporate a gelling/polymerizing agent that, when in contact with the reactive electrolyte (for example water), leads to the formation of an impervious polymer on the anode (e.g., lithium) surface. This safety measure is used for the case where the substantially impervious layer of the protective architecture (e.g., a glass or glass-ceramic membrane) cracks or otherwise breaks down and allows the aggressive catholyte to enter and approach the lithium electrode raising the possibility of a violent reaction between the Li anode and aqueous catholyte. Such a reaction can be prevented by providing in the anolyte a monomer for a polymer that is insoluble or minimally soluble in water, for example dioxolane (Diox) (for example, in an amount of about 5-20% by volume) and in the catholyte a polymerization initiator for the monomer, for example, a protonic acid. A Diox based anolyte may be composed of organic carbonates (EC, PC, DEC, DMC, EMC), ethers (1,2-DME, THF, 2MeTHF, 1,3-dioxolane and others) and their mixtures. Anolyte comprising dioxolane as a main solvent (e.g., 50-100% by volume) and Li salt, in particular, $LiAsF_6$, $LiBF_4$, $LiSO_3CF_3$, $LiN(SO_2C_2F_5)_2$, is especially attractive. Diox is a good passivating agent for Li surface, and good cycling data for Li metal has been achieved in the Diox based electrolytes (see, e.g., U.S. Pat. No. 5,506,068). In addition to its compatibility with Li metal, Diox in combination with above-mentioned ionic salts forms highly conductive electrolytes. A corresponding aqueous catholyte contains a polymerization initiator for Diox that produces a Diox polymerization product (polydioxolane) that is not or is only minimally soluble in water.

If the membrane breaks down, the catholyte containing the dissolved initiator comes in direct contact with the Diox based anolyte, and polymerization of Diox occurs next to the Li anode surface. Polydioxolane, which is a product of Diox polymerization, has high resistance, so the cell shuts down. In addition, the Polydioxolane layer formed serves as a barrier preventing reaction between the Li surface and the aqueous catholyte. Diox can be polymerized with protonic acids dissolved in the catholyte. Also, the water soluble Lewis acids, in particular benbenzoyl cation, can serve this purpose.

Thus, improvement in cyclability and safety is achieved by the use of a dioxolane (Diox) based anolyte and a catholyte containing a polymerization initiator for Diox.

Active Metal Ion and Alloy Anodes

The invention pertains to batteries and other electrochemical structures such as protected anodes having anodes composed of active metals, as described above. A preferred active metal electrode is composed of lithium (Li). Suitable first layers (for solid state implementations) and anolytes (for partially solid state implementations) for these structures and cells are described above.

The invention also pertains to protected anodes having active metal ion (e.g., lithium-carbon) or active metal alloy (e.g., Li—Sn) anodes. Some structures may initially have uncharged active metal ion intercalation materials (e.g., carbon) or alloying metals (e.g., tin (Sn)) that are subsequently charged with active metal or active metal ions. While the invention may be applicable to a variety of active metals, it is described herein primarily with reference to lithium, as an example.

Carbon materials commonly used in conventional Li-ion cells, in particular petroleum coke and mesocarbon microbead carbons, can be used as anode materials in Li-ion aqueous battery cells. Lithium alloys comprising one or several of the metals selected from the group including Ca, Mg, Sn, Ag, Zn, Bi, Al, Cd, Ga, In and Sb, preferably Al, Sn or Si, can also be used as anode materials for such a battery. In one particular embodiment the anode comprises Li, Cu and Sn.

In accordance with the partially solid state protective membrane architecture embodiment of the present invention the anolyte for such structures can incorporate supporting salts, for example, $LiPF_6$, $LiBF_4$, $LiAsF_6$, $LiClO_4$, $LiSO_3CF_3$, $LiN(CF_3SO_2)_2$ or $LiN(SO_2C_2F_5)_2$ dissolved in binary or ternary mixtures of non-aqueous solvents, for example, EC, PC, DEC, DMC, EMC, MA, MF, commonly used in conventional Li-ion cells. Gel-polymer electrolytes, for instance electrolytes comprising one of the above mentioned salts, a polymeric binder, such as PVdF, PVdF-HFP copolymer, PAN or PEO, and a plasticizer (solvent) such as EC, PC, DEC, DMC, EMC, THF, 2MeTHF, 1,2-DME and their mixtures, also can be used.

For batteries using these anodes, a suitable cathode structure may be added to the electrochemical structure on the other side of the protective architecture. The architecture enables Li-ion type cells using a number of exotic cathodes such as air, water, metal hydrides or metal oxides. For Li-ion aqueous battery cells, for example, aqueous catholyte can be basic, acidic or neutral and contains Li cations. One example of a suitable aqueous catholyte is 2 M LiCl, 1 M HCl.

During the first charge of the battery with lithium-carbon lithium alloy anode, Li cations are transported from the catholyte through the protective architecture (including the anolyte) to the anode surface where the intercalation process takes place as in conventional Li-ion cells. In one embodiment, the anode is chemically or electrochemically lithiated ex-situ before cell assembly.

Cell Designs

Electrochemical structures and battery cells in accordance with the present invention may have any suitable geometry. For example, planar geometries may be achieved by stacking planar layers of the various components of the structures or cells (anode, interlayer, cathode, etc.) according to known battery cell fabrication techniques that are readily adaptable to the present invention given the description of the structure or cell components provided herein. These stacked layers may be configured as prismatic structures or cells.

Alternatively, the use of tubular glass or glass-ceramic electrolytes with a non-aqueous interlayer architecture allows for the construction of high surface area anodes with low seal area. As opposed to flat-plate design where the seal length increases with cell surface area, tubular construction utilizes an end seal where the length of the tube can be increased to boost surface area while the seal area is invariant. This allows for the construction of high surface area Li/water and Li/air cells that should have correspondingly high power density.

The use of a non-aqueous interlayer architecture (partially solid state embodiment) in accordance with the present invention facilitates construction. An open-ended (with a seal) or close-ended glass or glass-ceramic (i.e., substantially impervious active metal ion conductive solid electrolyte) tube is partially filled with a non-aqueous organic electrolyte (anolyte or transfer electrolyte) as described above, for example such as is typically used in lithium primary batteries A lithium metal rod surrounded by some type of physical separator (e.g., a semi-permeable polymer film such as Celgard, Tonin, polypropylene mesh, etc.) having a current collector is inserted into the tube. A simple epoxy seal, glass-to-metal seal, or other appropriate seal is used to physically isolate the lithium from the environment.

This technology can also be used to build Li/water, Li/metal hydride or Li/metal oxide cells by substituting the air electrode with suitable aqueous, metal hydride or metal oxide cathode systems, as described herein above.

In addition to the use of lithium metal rods or wires (in capillary tubes), this invention can also be used to isolate a rechargeable $LiC_x$ anode from aqueous or otherwise corrosive environments. In this case, appropriate anolyte (transfer electrolyte) solvents are used in the tubular anode to form a passive film on the lithiated carbon electrode. This would allow the construction of high surface area Li-ion type cells using a number of exotic cathodes such as air, water, metal hydrides or metal oxides.

These same cell formats can also be constructed using the fully solid state protective architectures in accordance with the present invention.

An alternate cell format incorporating an active metal anode with a protective architecture in accordance with the present invention is a fuel cell, comprising: a renewable active metal anode; a cathode structure comprising a electronically conductive component, an ionically conductive component, and a fluid oxidant; an ionically conductive protective membrane on the first surface of the anode, the membrane comprising, one or more materials, comprising a glassy, ceramic or glass-ceramic solid electrolyte material based on lithium hafnium phosphate, configured to provide a first surface chemically compatible with the active metal of the anode in contact with the anode, and a second surface substantially impervious to and chemically compatible with the cathode structure and in contact with the cathode structure.

Performance, Properties and Advantages

The protected anode architecture of the present invention effectively isolates (de-couples) the anode from ambient and/or cathode, including catholyte (i.e., electrolyte about the cathode) environments, including such environments that are normally highly corrosive to Li or other active metals, and at the same time allows ion transport in and out of these potentially corrosive environments. In this way, a great degree of flexibility is permitted the other components of an electrochemical device, such as a battery cell, made with the architecture. Isolation of the anode from other components of a battery cell or other electrochemical cell in this way allows the use of virtually any solvent, electrolyte and/or cathode material in conjunction with the anode. Also, optimization of electrolytes or cathode-side solvent systems may be done without impacting anode stability or performance.

Alternative Embodiments

A number of other rechargeable lithium/aqueous chemistries are possible in accordance with the present invention. Some examples of these are:
Lithium-Nickel Battery The nickel electrode, NiOOH, is well known to those skilled in the art, and has been used commercially for many years in rechargeable nickel/cadmium batteries, and more recently in rechargeable nickel/metal hydride batteries.

Anode reaction: $Li = Li^+ + e^-$

Cathode reaction: $NiOOH + H_2O + e^- = Ni(OH)_2 + OH^-$

Cell reaction: $Li + NiOOH + H_2O = Ni(OH)_2 + LiOH$

The nickel electrode is highly reversible, and the combination of a protected Li anode with a NiOOH cathode results in a high energy density, high cycle life battery.
Lithium-Silver Battery The silver electrode, AgO, is also well known commercially in the Ag/Zn battery; a high rate battery used largely by the military.

Anode reaction: $Li = Li^+ + e^-$

Cathode reaction: $AgO + H_2O + 2e^- = Ag + 2OH^-$

Cell reaction: $4Li + 2AgO + 2H2O = 4LiOH + 2Ag$

The combination of a lithium anode and silver cathode results in a high rate, rechargeable battery.

Further, a variety of new aqueous battery chemistries enabled by the present invention can result from the combination of protected lithium anodes with transition metal oxides such as iron oxide, lead oxide, manganese oxide and others.
Li/Water Battery and Hydrogen Generator for Fuel Cell The use of protective architecture on active metal electrodes in accordance with the present invention allows the construction of active metal/water batteries that have negligible corrosion currents, described above. The Li/water battery has a very high theoretical energy density of 8450 Wh/kg. The cell reaction is $Li + H_2O = LiOH + \frac{1}{2} H_2$. Although the hydrogen produced by the cell reaction is typically lost, in this embodiment of the present invention it is used to provide fuel for an ambient temperature fuel cell. The hydrogen produced can be either fed directly into the fuel cell or it can be used to recharge a metal hydride alloy for later use in a fuel cell. At least one company, Millenium Cell makes use of the reaction of sodium borohydride with water to produce hydrogen. However, this reaction requires the use of a catalyst, and the energy produced from the chemical reaction of $NaBH_4$ and water is lost as heat.

$NaBH_4 + 2H_2O \rightarrow 4H_2 + NaBO_2$

When combined with the fuel cell reaction, $H_2 + O_2 = H_2O$, the full cell reaction is believed to be:

$NaBH_4 + 2O_2 \rightarrow 2H_2O + NaBO_2$

The energy density for this system can be calculated from the equivalent weight of the $NaBH_4$ reactant (38/4=9.5 grams/equiv.). The gravimetric capacity of $NaBH_4$ is 2820 mAh/g; since the voltage of the cell is about 1, the specific energy of this system is 2820 Wh/kg. If one calculates the energy density based on the end product $NaBO_2$, the energy density is lower, about 1620 Wh/kg.

In the case of the Li/water cell, the hydrogen generation proceeds by an electrochemical reaction believed described by:

$Li + H_2O = LiOH + \frac{1}{2}H_2$

Figure 7:
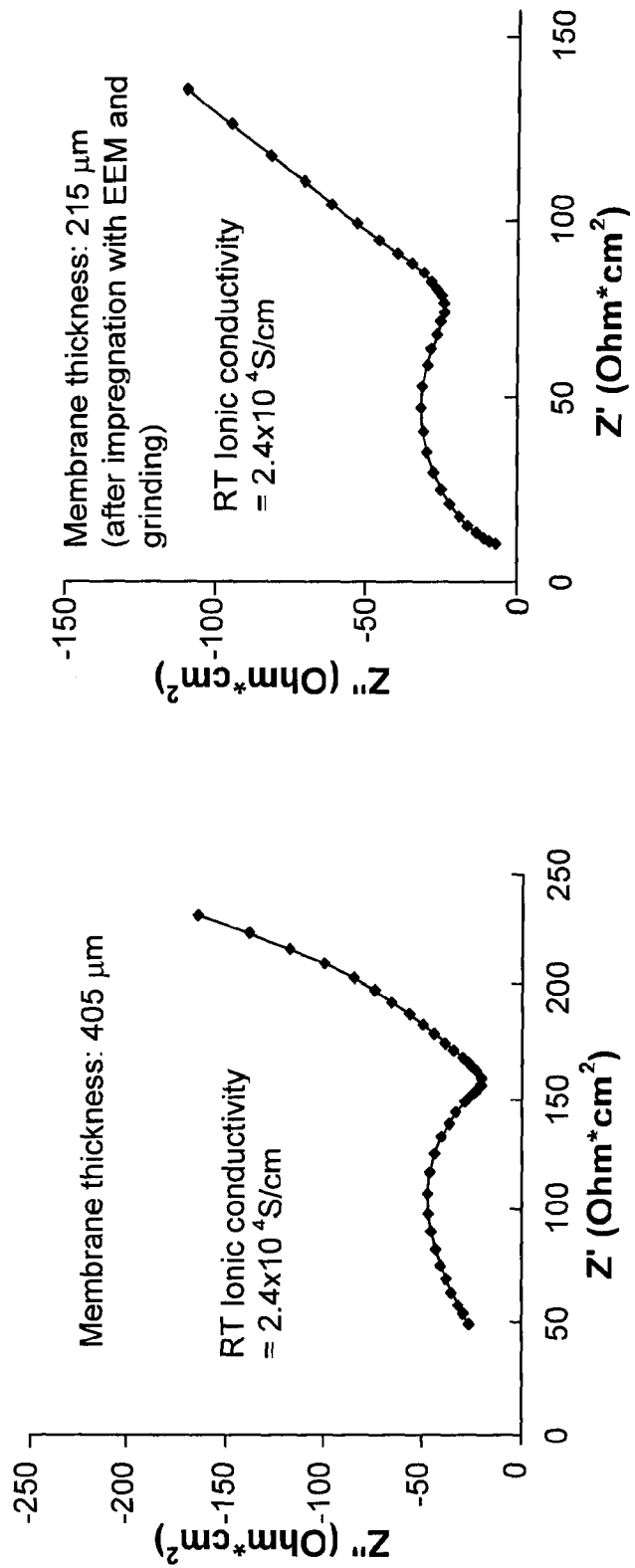
FIGS. 7A-B depict plots of complex impedance for an unfilled solid electrolyte base component and a composite solid electrolyte, respectively.

In this case, the energy of the chemical reaction is converted to electrical energy in a 3 volt cell, followed by conversion of the hydrogen to water in a fuel cell, giving an overall cell reaction believed described by:

$Li + \frac{1}{2}H_2O + \frac{1}{4}O_2 = LiOH$ where all the chemical energy is theoretically converted to electrical energy. The energy density based on the lithium anode is 3830 mAh/g at a cell potential of about 3 volts which is 11,500 Wh/kg (4 times higher than $NaBH_4$). If one includes the weight of water needed for the reaction, the energy density is then 5030 Wh/kg. If the energy density is based on the weight of the discharge product, LiOH, it is then 3500 Wh/kg, or twice the energy density of the $NaBO_2$ system. This can be compared to previous concepts where the reaction of lithium metal with water to produce hydrogen has also been considered. In that scenario the energy density is lowered by a factor of three, since the majority of the energy in the $Li/H_2O$ reaction is wasted as heat, and the energy density is based on a cell potential for the $H_2/O_2$ couple (as opposed to 3 for $Li/H_2O$) which in practice is less than one. In this embodiment of the present invention, illustrated in FIG. 7, the production of hydrogen can also be carefully controlled by load across the Li/water battery, the Li/water battery has a long shelf life due to the protective membrane, and the hydrogen leaving the cell is already humidified for use in the $H_2$/air fuel cell.

EXAMPLES

The following examples provide details illustrating features and advantageous properties of composite solid electrolytes for protection of active metal anodes in accordance with the present invention. These examples are provided to exemplify and more clearly illustrate aspects of the present invention and are not intended to be limiting.

Example 1

Fabrication of Composite Solid Electrolytes Formed by Vacuum Impregnation

One of the advantageous properties of some epoxy embedding media is low viscosity, prior to hardening or curing, that facilitates filling a solid electrolyte base component having a wide range of pore sizes, including micron and sub-micron pore sizes, which may exist in ceramic membranes. Good results have been achieved with a low viscosity epoxy embedding media (EEM) containing glycerol glycidyl ethers and anhydrides as hardeners. Maleic anhydride, 2-dodecenylsuccinic anhydride (DDSA) and methylnadic anhydride (NMA) are particular examples of such hardeners. Tris(dimethylaminomethyl)phenol (DMP-30) can be used as an accelerator in this system.

Li-ion conductive sintered ceramic membranes (solid electrolyte base component) with NASICON-type structure and with dimension of 1"×1" were received from OHARA Corporation, Japan. The membranes were 200 to 400 microns thick. An epoxy embedding media (EEM) based on glycerol glycidyl ethers was received from Fluka. DDSA and NMA also received from Fluka were used as hardeners. DMP-30 was used as an accelerator. 5.0 ml of the EEM was mixed with 3.1 ml of DDSA and 2.7 ml of NMA and stirred for approximately 30 minutes. After addition of several drops of DMP-30 accelerator, the mixture was stirred again for 15-20 minutes. Filling the membranes with the prepared mixture was performed by impregnation under vacuum. Specifically, the membrane was placed into a Teflon bath containing the prepared mixture of EEM, DDSA, NMA and DMP-30 such that the membrane was completely immersed in the mixture. Then the bath was placed in a vacuum oven. Air was evacuated and temperature in the oven was increased to approximately 70° C. The bath with the membrane immersed in the mixture was kept under vacuum at 70° C. for 30 minutes. During the first few minutes active bubbling of the EEM-containing mixture was observed, which then stopped indicating complete air evacuation from the pores of the membrane immersed in the prepared mixture. Then vacuum was released and the membrane in the bath was turned over. The bath with the membrane immersed in the mixture was kept under vacuum at 70° C. for 30 more minutes. Then vacuum was released, the membrane was removed from the bath, and the epoxy was allowed to drain. Using Kimwipes from KIMTECH Science Corp. the remaining excess of epoxy was wiped off from both sides of the membrane. Then the membrane was placed on a Teflon sheet, and the epoxy was hardened in an oven without vacuum at 120° C. overnight.

Lastly, the polymer left on the membrane surfaces was removed by grinding them with CarbiMet abrasive discs (grits 400, 800 and 1200) purchased from Buehler Ltd., followed by polishing the surfaces with 1 μm alumina powder (Micropolish II from Buehler Ltd.). Usually, 20-25 μm (in some cases ~100 μm) were ground off from each side of the membrane.

Example 2

Comparative Leak Testing of a Composite Solid Electrolyte Vs. An Unfilled Solid Electrolyte Base Component The composite solid electrolyte was fabricated as described in Example 1 and was leak tested to determine imperviousness. For comparison, leak testing of the unfilled base component was also performed.

The ceramic membranes (solid electrolyte base component) of 1"×1" in size, one of them "as received" from the OHARA Corporation. and the second one after impregnation, as described in Example 1, with the EEM and grinding, were attached to the ends of pyrex tubes using Hysol E 120 HP epoxy glue. The tubes had an OD of 25 mm and a wall thickness of 1.5 mm. The bonded plate/tube assemblies were attached to a Varian 938-41 helium leak detector. In the case of the ceramic membrane filled with the EEM (composite solid electrolyte layer), the helium leak detector showed no leak through the seal when the volume was evacuated and the helium tracer probe was used. The sensitivity of the detector was $2\times10^{-10}$ atm cc/sec for helium. At the same time, in the case of the of the membrane which had not been filled with the EEM ("as received" base component layer), the volume could not be evacuated at all indicating severe leakage (fluid flow) through the ceramic membrane caused by the presence of through porosity.

Example 3

Ionic Conductivity of a Composite Solid Electrolyte Vs. An Unfilled Solid Electrolyte Base Component To find out if the process of impregnating the ceramic membrane (base component layer) with EEM filler to form the solid electrolyte composite adversely affects its ionic conductivity, impedance of the "as received" ceramic membrane (base component), before filling the through pores, and of a solid electrolyte composite (ceramic membrane impregnated with EEM and ground from both sides) fabricated as described in Example 1, was determined. For impedance measurements, the two major surfaces of the composite and the base component were sputtered with gold films of about 1 gm in thickness. Ionic conductivity values for both the base component and the composite were calculated from the high intercepts in the complex impedance plots shown in FIGS. 7A-B, respectively. The determined value of ionic conductivity of $2.4\times10^{-4}$ S/cm was the same for both the composite and the base component. Therefore, impregnation of a ceramic membrane base component with the EEM to form a composite solid electrolyte does not lead to a reduction in the conductivity of the base component layer.

Example 4

Performance of a Composite Solid Electrolyte in a Li/Aqueous Cell and a Li/Seawater Cell The composite solid electrolyte was fabricated as described in Example 1. The base component was a Li ion conductive ceramic membrane that was received from the OHARA corporation and is the same as those described in Example 1. The base component was impregnated with the epoxy embedding media as described in Example 1 to form the filler component of the composite. In this example, a protected anode having a partially solid-state protective membrane architecture employing the composite solid electrolyte of the instant example as the substantially impervious layer, was fabricated and tested in a Li/aqueous cell as further described below.

For comparison, a similar Li/aqueous cell having a protected anode having a partially solid-state protective membrane architecture was fabricated and tested except that this cell used the unfilled solid electrolyte base component in place of the composite solid electrolyte.

Ceramic membranes from OHARA Corporation with and without the EEM impregnation were used in Li/aqueous cells as the substantially impervious layer of the protective membrane architecture. The cell structure was Li/non-aqueous anolyte/composite solid electrolyte (filled ceramic membrane)/aqueous catholyte/Ti and the comparison cell was Li/non-aqueous anolyte/unfilled solid electrolyte base component (ceramic membrane "as received")/aqueous catholyte/Ti. The interlayer of the partially solid state protective membrane architecture was a microporous Celgard separator impregnated with a non-aqueous anolyte. An Ag/AgCl reference electrode placed into the aqueous catholyte next to the membrane surface was used to control the anode potential. Measured values were recalculated into potentials on the Standard Hydrogen Electrode (SHE) scale. A protected anode comprised a disc-shaped lithium foil with a diameter of ⅝ inch from FMC Lithium, Inc. pressed onto a Ni gauze current collector. The ceramic membranes were bonded to the ends of pyrex tubes as described in Example 2. Each membrane was exposed to an aqueous environment from one side and to a non-aqueous environment from the other side. In one case, the aqueous electrolyte comprised 1 M $NH_4Cl$ and 1 M LiCl. In the second case, it comprised artificial seawater from the Ricca Corporation. A microporous Celgard separator 3401 with a thickness of 25 µm placed on the other side of the membrane was filled with a non-aqueous electrolyte comprising 1 M $LiClO_4$ dissolved in propylene carbonate. The loading volume of the nonaqueous anolyte was approximately 0.35 ml per 1 $cm^2$ of Li electrode surface. A Ti screen counter electrode (cathode) completely immersed in the aqueous electrolyte was used to facilitate hydrogen reduction.

Figure 8:
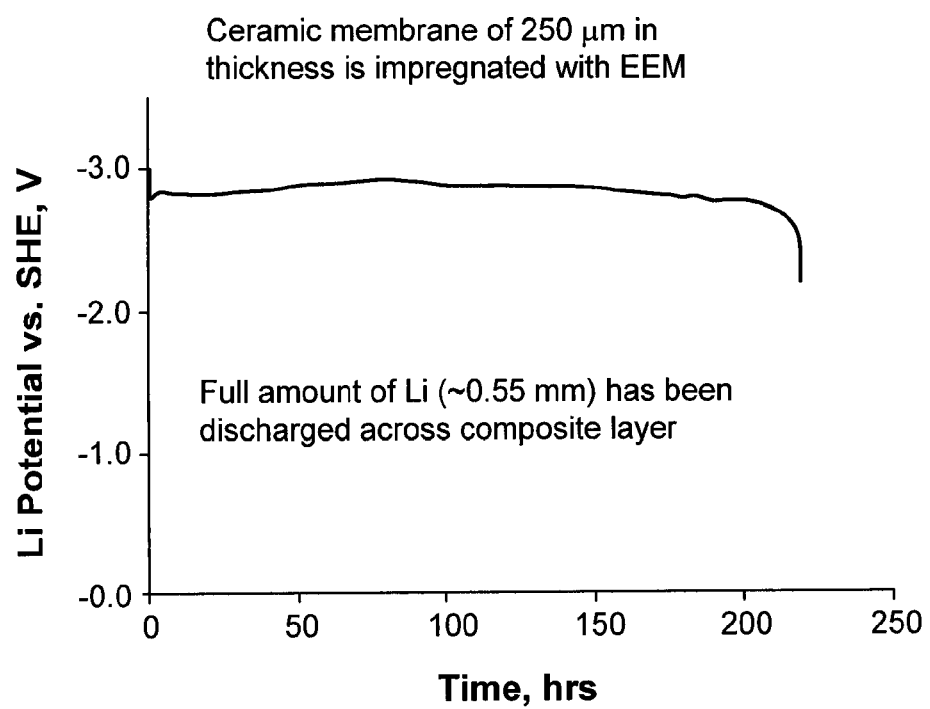
FIG. 8 depicts a plot of a discharge curve of a Li/aqueous cell having a protected anode incorporating the inventive composite solid electrolyte and the aqueous electrolyte comprising an aqueous solution of 1 M $NH_4Cl$ and 1 M LiCl.
Figure 9:
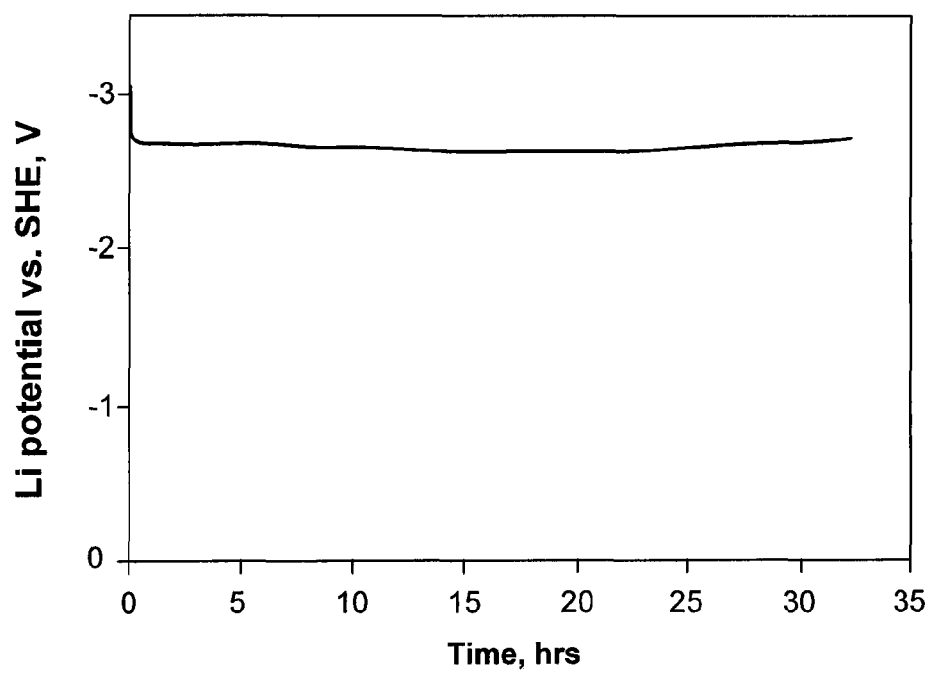
FIG. 9 depicts a plot of a discharge curve of a Li/seawater cell having a protected anode incorporating the inventive composite solid electrolyte.

As shown in FIGS. 8 and 9, an open circuit potential (OCP) of approximately 3 volts vs. SHE corresponding closely to the thermodynamic potential difference between $Li/Li^+$ and $H_2/H^+$ in water was observed in both electrolytes. FIGS. 8 and 9 show potential-time curves for Li anodic dissolution at a discharge rate of 0.5 $mA/cm^2$ for 1 M $NH_4Cl$, 1 M LiCl in water and seawater electrolytes, respectively. The results indicate that a Li anode protected with EEM-impregnated ceramic membrane can successfully operate in aqueous electrolytes and has a stable discharge voltage.

It is important to note that the similar cell constructed with a similar ceramic membrane without EEM impregnation could not function. Several minutes after cell assembly this membrane completely shattered due to water permeation through the membrane and water reaction with Li.

Example 5

Performance of an Alternative Composite Solid Electrolyte in a Li/Aqueous Cell

The composite solid electrolyte was fabricated as described below. The solid electrolyte base component layer was a Li ion conductive ceramic membrane that was received from the OHARA corporation and was described in Example 1. The base component layer was impregnated with Duralco 4460 epoxy as filler. In this example, a protected anode employing the composite solid electrolyte of the instant example as the substantially impervious layer of a partially solid state protective membrane architecture was fabricated and tested in a Li/aqueous cell as further described below.

Low viscosity epoxy Duralco 4460 was used for vacuum impregnation of Li-ion conductive ceramic membranes with NASICON-type structure received from OHARA Corporation and described in Example 1. An EE 4460-25 kit containing 1 jar of Duralco 4460 resin and 1 syringe of Duralco 4460 hardener was purchased from Contronics Corporation. 5 ml of the hardener and 6.4 ml of the resin were mixed using a Thinky AR-250 mixer from Thinky Corporation, Japan for 5 minutes in the mixing mode followed by 0.5 minutes in the defoaming mode. Then the membrane was impregnated with this mixture using the procedure described in Example 2. The polymer residue was removed from the membrane surfaces by grinding them with CarbiMet abrasive discs (grits 400, 800 and 1200) purchased from Buehler Ltd. Then the membrane surfaces were polished with 1 µm alumina powder (Micropolish II from Buehler Ltd.). 20-25 gm were ground off from each side of the membrane. The final thickness of the composite membrane was 250 µm.

Figure 10:
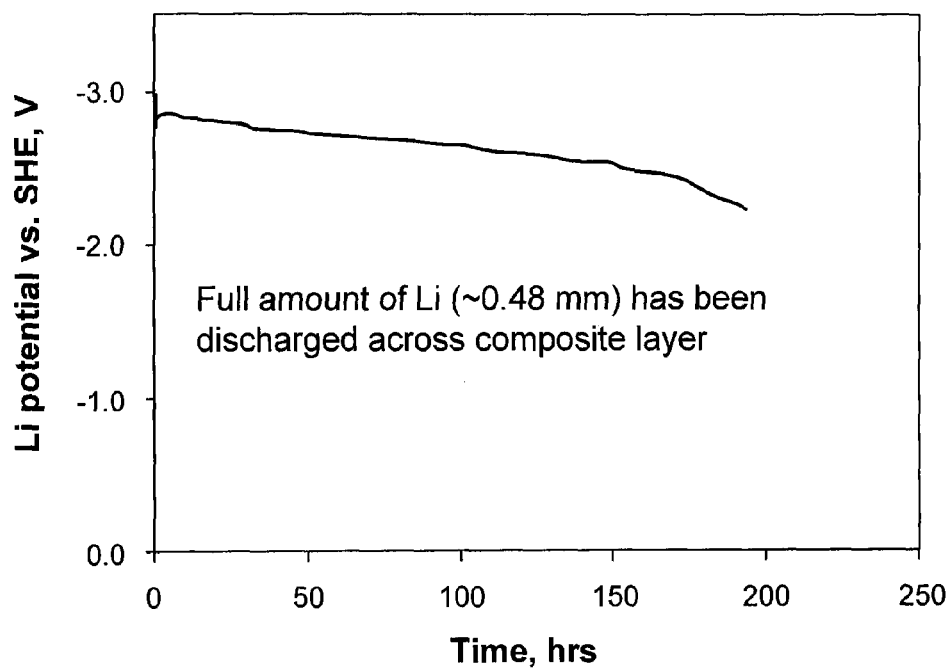
FIG. 10 depicts a plot of a discharge curve of a Li/aqueous cell having a protected anode incorporating an alternative inventive composite solid electrolyte and the aqueous electrolyte comprising an aqueous solution of 2 M LiOH.

FIG. 10 depicts a plot of the anode potential-time discharge curve of a Li/Aqueous cell similar to the cell described in Example 4. The composite solid electrolyte layer acted as a second material layer of the protective anode. In this experiment the aqueous electrolyte comprised 2 M LiOH. At a discharge current density of 0.5 $mA/cm^2$ the cell exhibited a long discharge for approximately 195 hours. Delivered capacity closely corresponded to the full amount of Li in the anode. This example demonstrates that the solid electrolyte composites comprising porous ceramic membranes vacuum-impregnated with Duralco 4460 epoxy can be successfully used as a substantially impervious layer in a protected anode to protect Li anodes in Li/Aqueous cells employing aggressive aqueous electrolytes.

Conclusion

Although the foregoing invention has been described in some detail for purposes of clarity of understanding, it will be apparent that certain changes and modifications may be practiced within the scope of the appended claims. It should be noted that there are many alternative ways of implementing the process, compositions and architectures of the present invention. Accordingly, the present embodiments are to be considered as illustrative and not restrictive, and the invention is not to be limited to the details given herein.

What is claimed is:

1. A composite active metal ion conducting solid electrolyte membrane, comprising:
   an inorganic monolithic active metal ion conducting base component comprising a continuous inorganic solid electrolyte matrix having through pores that extend from one major surface of the base component to the opposing major surface, and a filler component contained in the through pores of the base component;
   wherein the active metal ion conductivity of the composite is within the same order of magnitude as the active metal ion conductivity of the base component matrix.

2. The composite active metal ion conducting solid electrolyte membrane of claim 1, wherein the active metal ion conductivity of the composite is not less than half the active metal ion conductivity of the base component.

3. The composite active metal ion conducting solid electrolyte membrane of claim 1, wherein the density of the active metal ion conducting base component is greater than 75% and less than 95% of the theoretical density of the base component material.

4. The composite active metal ion conducting solid electrolyte membrane of claim 1, wherein the density of the active metal ion conducting base component is greater than 95% of the theoretical density of the base component material.

5. The composite active metal ion conducting solid electrolyte membrane of claim 1, wherein the filler component is a conductor of the active metal ion.

6. The composite active metal ion conducting solid electrolyte membrane of claim 5, wherein the conductive filler component is a polymer electrolyte.

7. The composite active metal ion conducting solid electrolyte membrane of claim 6, wherein the polymer electrolyte comprising a polymer and an active metal salt.

8. The composite active metal ion conducting solid electrolyte membrane of claim 7, wherein the polymer comprises polyethylene oxide (PEO).

9. The composite active metal ion conducting solid electrolyte membrane of claim 7, wherein the polymer comprises crosslinked PEO.

10. The composite active metal ion conducting solid electrolyte membrane of claim 7, wherein the polymer comprises amorphous PEO.

11. The composite active metal ion conducting solid electrolyte membrane of claim 1, wherein the active metal ion conducting filler component is an active metal ion conducting glass-ceramic.

12. The composite active metal ion conducting solid electrolyte membrane of claim 1, wherein the active metal ion conducting filler component is an active metal ion conducting glass.

13. The composite active metal ion conducting solid electrolyte membrane of claim 1, wherein the inorganic base component is a ceramic and the active metal ion conductive filler component is a glass.

14. The composite active metal ion conducting solid electrolyte membrane of claim 1, wherein the inorganic base component is a ceramic and the active metal ion conductive filler component is a glass-ceramic.

15. The composite active metal ion conducting solid electrolyte membrane of claim 14, wherein the density of the active metal ion conducting base component is greater than 95% of the theoretical density of the base component material.

16. The composite active metal ion conducting solid electrolyte membrane of claim 1, wherein the inorganic base component is a glass-ceramic and the active metal ion conductive filler component is a polymer electrolyte.

17. The composite active metal ion conducting solid electrolyte membrane of claim 1, wherein the inorganic base component is a ceramic and the active metal ion conductive filler component is a polymer electrolyte.

18. The composite active metal ion conducting solid electrolyte membrane of claim 1, wherein the active metal ion is lithium.

19. A protected anode, comprising:
an active metal anode having a first and second surface;
a protective membrane architecture on at least the first surface of the anode, the architecture having ionic conductivity of the active metal of at least $10^{-6}$ S/cm; and
wherein the protective membrane architecture comprises a substantially impervious composite solid electrolyte membrane according to claim 1.

20. A battery cell, comprising:
a protected anode in accordance with claim 19; and
a cathode structure.

* * * * *